United States Patent
Cook et al.

(10) Patent No.: US 9,405,660 B2
(45) Date of Patent: Aug. 2, 2016

(54) INTERMEDIARY FOR TESTING CONTENT AND APPLICATIONS

(71) Applicant: Amazon Technologies, Inc., Reno, NV (US)

(72) Inventors: James M. Cook, Kirkland, WA (US); Daniel Thomas Tattersall, Seattle, WA (US); Te-Lin Tuan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 14/308,950

(22) Filed: Jun. 19, 2014

(65) Prior Publication Data

US 2014/0298298 A1 Oct. 2, 2014

Related U.S. Application Data

(63) Continuation of application No. 13/243,511, filed on Sep. 23, 2011, now Pat. No. 8,788,885.

(51) Int. Cl.
*G06F 11/00* (2006.01)
*G06F 11/36* (2006.01)

(52) U.S. Cl.
CPC ........ *G06F 11/3664* (2013.01); *G06F 11/3668* (2013.01)

(58) Field of Classification Search
CPC .................... G06F 11/3664; G06F 11/3668
USPC ................... 714/25, 27, 38.1, 40, 43
See application file for complete search history.

(56) References Cited

U.S. PATENT DOCUMENTS

| | | |
|---|---|---|
| 6,434,615 B1 | 8/2002 | Dinh et al. |
| 6,662,220 B1 | 12/2003 | Meyer |
| 6,697,969 B1 | 2/2004 | Merriam |
| 7,093,169 B2 | 8/2006 | Merriam |
| 7,231,606 B2 | 6/2007 | Miller et al. |
| 7,934,200 B2 | 4/2011 | Liu |
| 8,136,095 B2 | 3/2012 | Natanov et al. |
| 8,180,679 B2 | 5/2012 | Chen et al. |
| 8,271,836 B2 | 9/2012 | Hawkins |
| 8,286,133 B2 | 10/2012 | Natanov et al. |
| 8,464,224 B2 | 6/2013 | Dulip et al. |
| 8,538,414 B1 | 9/2013 | Beans et al. |
| 2005/0138426 A1* | 6/2005 | Styslinger ........... H04L 63/0281 726/4 |
| 2006/0224921 A1 | 10/2006 | Marimuthu |
| 2009/0037882 A1* | 2/2009 | Allen .................. G06F 11/3664 717/125 |
| 2009/0113250 A1 | 4/2009 | Meijer et al. |
| 2009/0132856 A1 | 5/2009 | Gorman et al. |
| 2009/0164478 A1 | 6/2009 | Natanov et al. |

(Continued)

*Primary Examiner* — Joshua P Lottich
(74) *Attorney, Agent, or Firm* — Lee & Hayes, PLLC

(57) ABSTRACT

A test device may include an application that accesses online content. In some examples, a test intermediary and/or a test user interface (UI) are downloaded to the test device in response to a request by the application for obtaining the content from a network location. The test intermediary may be positioned to receive communications between the application and the content during testing of the content and/or the application. For example, the test intermediary may intercept metrics and other callbacks passed between the content and the application during manual or automated testing. In some instances, the test intermediary may provide the metrics and/or other test outputs for display in the test user UI rendered on the test device. The content may be rendered to be functional within the test UI, and the existence of the test intermediary and/or the test UI may be transparent to the application and the content.

20 Claims, 14 Drawing Sheets

(56) References Cited

U.S. PATENT DOCUMENTS

| | | |
|---|---|---|
| 2009/0164975 A1 | 6/2009 | Natanov et al. |
| 2010/0333072 A1 | 12/2010 | Dulip et al. |
| 2011/0004790 A1 | 1/2011 | Rossmann et al. |
| 2011/0067004 A1* | 3/2011 | Birsan ............... G06F 11/3664 717/125 |
| 2013/0219217 A1 | 8/2013 | Seren et al. |

* cited by examiner

INTERMEDIARY FOR TESTING CONTENT AND APPLICATIONS

RELATED APPLICATIONS

This application claims priority to and is a continuation of U.S. patent application Ser. No. 13/243,511, filed on Sep. 23, 2011, the entire contents of which are incorporated herein by reference.

BACKGROUND

Some applications display web content or other online content in an interface provided by the application. As one example, some types of applications, such as applications that are executable on mobile devices or other computing devices, use webview technology to enable access to online content from within the application. Thus, rather than opening a browser outside the application or enabling full browser functionality within the application, an application may render a webview that provides access to desired downloadable content, such as a webpage, typically with at least partial functionality. For instance, the application displaying the webview may control or limit the amount of interaction that the user has with the online content displayed in the webview. The recent proliferation of mobile computing devices, smart phones, tablet computing devices, digital media devices, and the like, has led to a huge increase in the number of applications, devices and platforms that display online content within the native application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Testing Applications and Content

Figure 1:
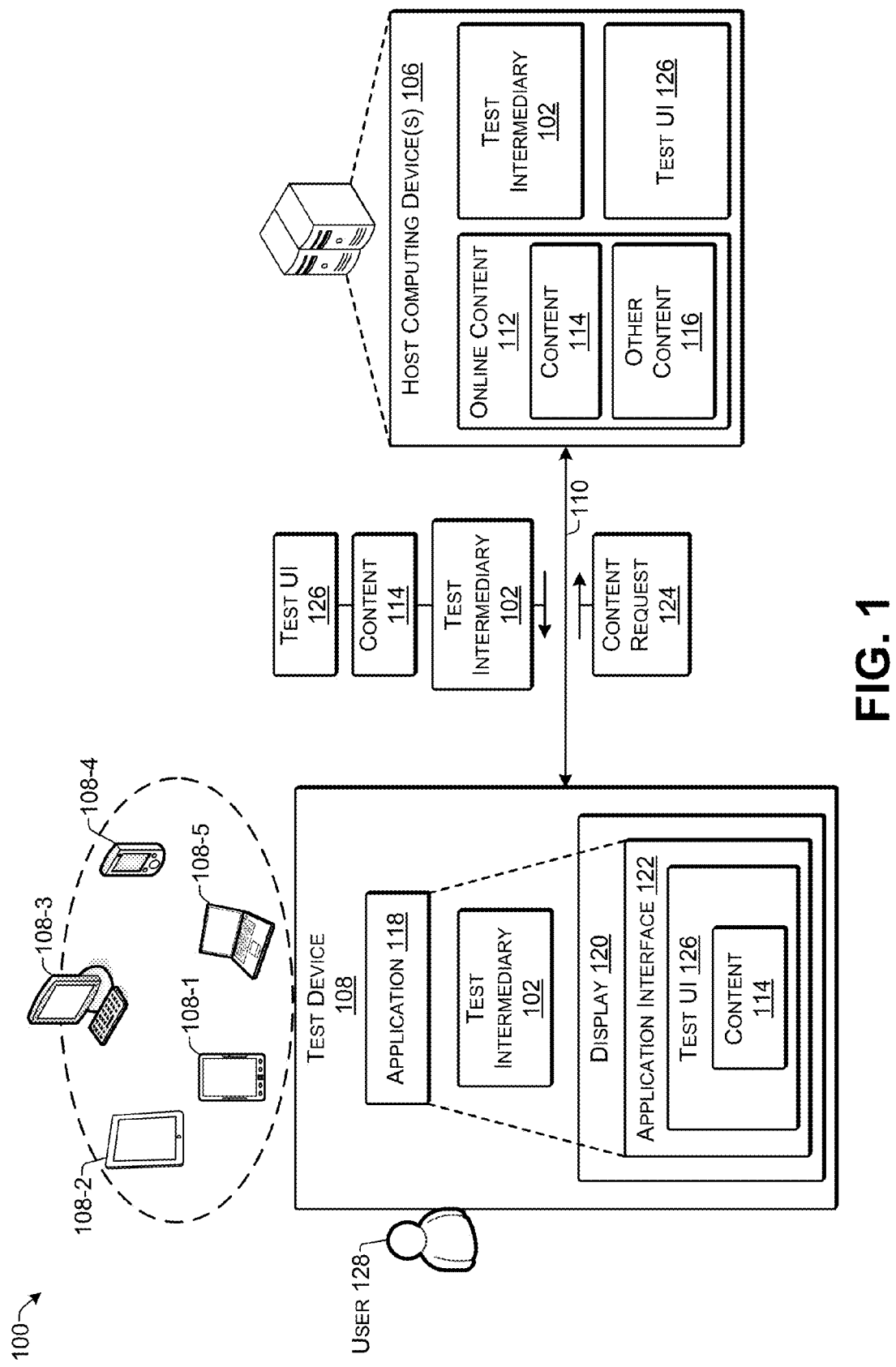
FIG. 1 illustrates an example architecture of a system including a test intermediary for testing content and/or an application according to some implementations.

This disclosure includes techniques and arrangements for performing testing of online technologies. For example, the techniques may include testing of online content, such as a webpage or other content that is downloaded and rendered by an application. Further, the techniques may include testing of applications that download and render online content within the application, such as in a webview or other interface provided by the application. In some implementations, a test intermediary is provided between an application on a test device and online content rendered on the test device. As one example, when the application requests content based on a particular uniform resource locator (URL), a computing device corresponding to the particular URL may provide the test intermediary in addition to or in place of the requested content. The test intermediary may insert itself between the application and the content for intercepting communications between the application and the content. For example, the test intermediary may insert itself into the communication path between the content and the application based on knowledge of a communication agreement or configuration between the content and the application.

In some examples, the test intermediary is implemented as executable code, a computer program, processor-executable instructions, computer-readable instructions, or other functional component that may be executed on a processor of the test device. For instance, the test intermediary may be written in JavaScript®, HTML (hypertext markup language), Flash®, or other suitable programming language to provide a functional component that is maintained in a memory and executed by a processor to perform the functions described herein. In some implementations, the test intermediary may be returned to the test device in response to a request for content made by the test device. Alternatively, the test intermediary may be preloaded on the test device. The test intermediary may receive or intercept communications passed between content being tested and an application that accessed the content. As one non-limiting example, the test intermediary may be patched into, or may patch itself into an application programming interface (API) that enables communication between the application and the content.

The content herein may by any code capable of generating or providing content that can be rendered by an application, a browser, or the like. In some implementations, the content may be an interactive webpage viewable in a webview or other application interface provided by the application. As several non-limiting examples, the content may be implemented by instructions written in JavaScript®, HTML (hypertext markup language), Flash® or other suitable programming language. Thus, the content may include code or other processor executable instructions stored in a memory and executable on a processor to provide the content for display by the application.

In some examples, a test user interface (UI) may also be delivered to the test device with the downloaded content and the test intermediary. The test UI may be rendered by the application on the test device along with the downloaded content. As one example, the application may render the test UI in a functional application interface or framework, such as a webview, that combines or composites the original requested content within the test user interface. For example, the content to be tested may be rendered within the test UI in a manner that enables the content to be fully functional for testing purposes. Furthermore, the test UI may display test information in the test UI adjacent to the content being tested. For example, the test UI may display test metrics, test outputs, test progress, and other test information, in real time while testing of the content is carried out. In some instances, the test intermediary intercepts metrics and other communications between the application and the content, and may provide these to the test UI for display to a user. Additionally, in some instances, the test intermediary may determine its own metrics related to the testing.

The test intermediary and the test UI may include the capability to use supporting technologies of the online content and any associated libraries. For example, the test UI may be rendered in parallel with the content to be tested on the test device. The test UI and the test intermediary may share security-based properties, such as the same domain and protocols, with the content to be tested. This arrangement also provides the test intermediary with functionality for capturing metrics and enabling simulated user interaction with the content. For example, by intercepting and listening to parameters passed through callback interactions between the content and the application on the test device, relevant metrics can be captured and recorded.

Furthermore, rendering the test information side-by-side with the content being tested, using the same libraries, using similar coding technologies, and the like, also provides the test intermediary with the ability to interact directly with the content, such as by triggering event listeners within the content. Consequently, the test intermediary herein may include the capability to automate test interactions and record metrics data in real time when manual interaction or automated interaction is invoked. Additionally, portability of the test intermediary may be at least equal to the portability of the content being tested, and in some instances, the test intermediary may be more portable because less modification may be required for adapting the test intermediary behaviors across platforms, as compared with those of the content being tested.

The test intermediary may enable manual and/or automated testing of the content through a test device, such as a mobile device, a computing device, or other electronic device capable of displaying the content. For example, automated testing of the functionality of the content can be performed with partial manual interaction to initiate the automated tests on the test device. Further, the test intermediary can also enable manual testing of the content on the test device. The test intermediary and test UI can be used for testing of the content rendered within the application interface provided by the application executing on the device. Thus, the test intermediary and test UI enable simultaneous testing of not only the content, but also the interaction of the application with the content. For example, real time presentation of metrics and test outputs in the test UI can help a user identify whether a bug or malfunction originates within the content or the application.

During either manual or automated testing, the test metrics and/or other test outputs may be captured or determined by the test intermediary and displayed in the test UI in real time adjacent to the content being tested. Additionally, some implementations enable selection and execution of automated tests through interaction with the test UI displayed on the test device, such as by selection of a particular test through activation of a drop-down menu, or the like. Examples of tests that can be executed may vary from very basic tests of the content, such as whether the content loads correctly, to more complex performance tests that test particular features, user interface controls, or functions of the content. In some examples, the test intermediary may be used for performance testing in which tests are executed on the test device through the test intermediary, and the test intermediary captures the test metrics to provide a reliable indication of performance of the content and/or application on the test device. Regardless of whether the testing is performed manually or using automated interaction, the test intermediary is able to capture various metrics regarding the testing and test results, verify the state of the content using scripts that can inspect the content, and perform other functions to facilitate the testing, as described in additional detail below.

In some implementations, the content being tested may be rendered in an inline frame (iframe) within the test UI also rendered by the application. In one particular example, the content being tested is rendered within an iframe as part of a webview rendered on the test device that also includes the rendered test UI. Additionally, the current state of the content can be verified by the test intermediary using scripts that inspect the state of the content. For example, the test intermediary and test UI exist in the same domain/IP/protocol as the content so that the test intermediary is not subject to security restrictions, which enables the test intermediary to directly determine the current functional state of the content. The test UI and the content are rendered as a single page by the application so that the test UI and test intermediary are transparent to the application and the content. As one example, the application can load a webview page including the test UI and the content in the same fashion as the original content would have been loaded. For instance, during rendering of the test UI, the test intermediary or test UI may call another URL to render the original content in the iframe provided within the test UI. Furthermore, the iframe containing the content may be malleable to the needs of the content, such as with respect to sizing or URL parameters that determine properties of the device on which the test UI and the content are rendered. Further, since the test UI is constructed in a manner similar to the original content, the test UI may be as flexible and portable as the original content. Additionally, in some implementations, multiple iframes may be implemented in the test UI to enable contemporaneous display and testing of multiple different instances of content.

In addition, in some implementations, new code can be inserted into the content or existing code of the content can be edited by the test intermediary. For example, by changing the code of the content during testing, different forms of testing are possible, such as for simulating various user cases that would otherwise be difficult to generate. Thus, different content having different attributes may be generated automatically and tested by using the test intermediary to change one or more aspects of the code of the content during testing.

In some implementations, the test intermediary is configured to initiate automated UI interactions that directly interface with the content to simulate actions that a user would perform while interacting with the content. Accordingly, because the test intermediary coexists with the content, the test intermediary is able to capture and resend callbacks, which can serve as a method of controlling, verifying and acting upon the content, while the content itself can remain isolated and function as if it were in direct communication with the test device. Consequently, upon implementation of the test intermediary, the application callbacks do not interact directly with the content, and instead all communication between the application and the web component may pass through the test intermediary.

Additionally, in alternative implementations, the test intermediary may enable automated testing of the content through simulation using a browser running on a computing device, such as a personal computer, or other test device. For instance, simulated testing may be performed using a browser and a test simulation component that interacts with the test intermediary and which enables automation of a plurality of features that can be tested through browser DOM (document object model) validation. Additionally, in some implementations, the test simulator component communicates with the test intermediary to initiate UI interactions and perform other specified automated testing. For example, some implementations may use a java-code based test simulation component that issues instructions the test intermediary (e.g., tap an image, select a control, etc.) through the browser. The test automation may be inserted within the test intermediary code framework. Callbacks generated from the browser are accounted for by the test intermediary and communicated to the content by the test intermediary in a modified form, if necessary.

Implementations herein provide an efficient and useful approach to testing online content, applications, and other technologies, such as webview-based application extensions, online stores, ecommerce sites, and webpages rendered in a webview or as a web-like page on a device. Unlike conventional test technologies, the test intermediary herein can function with any application capable of displaying online content, such as in a webview, and is thus compatible with numerous devices, operating systems and platforms. Further, the test intermediary is compatible with and can leverage various standard libraries that are used by the content.

In addition, the test intermediary may enable various types of UI tests to be performed, such tests against javascript-based event listeners, while also providing a mechanism to temporarily remedy issues concerning cookies during testing. In addition, because the test metrics may be displayed in real time, a user can troubleshoot real time metrics information and determine which metrics are the results of which content or application events. Accordingly, some implementations herein provide an application-and-browser-agnostic test UI for testing of online content and technologies, such as on devices that support webviews through applications and browsers.

Some implementations are described in the environment of testing webview technology, such as webviews, websites, online applications, and so forth. However, the implementations herein are not limited to the particular examples provided, and may be extended to other types of testing and other types of technologies, as will be apparent to those of skill in the art in light of the disclosure herein.

Example Architectures

FIG. 1 illustrates an example architecture of a system 100 including a test intermediary 102 for executing testing of content, applications and other online technologies according to some implementations. The test intermediary 102 may be initially maintained on at least one host computing device 106. The host computing device 106 is able to communicate with at least one test device 108 through a communication link 110. As one example, the host computing device(s) 106 may include one or more servers or other suitable computing devices that maintain online content 112 for access by the test device 108. For example, the online content 112 may be maintained in association with one or more URLs or other network locations on the Internet or other network. The online content 112 may include content 114 to be tested, which may be an instance of online content 112 that will be tested on the device 108. The online content 112 may also include other content 116, which may include other instances of content to be tested and various other types of content that may be subsequently accessed and rendered, such as during the rendering or testing of the content being tested. In some implementations, the other content 116 may represent any amount of additional content, such as images, text, multimedia, etc., located across the World Wide Web and/or the Internet that may be accessed based on a URL address or other identifying information.

The test device 108 may be any type of device able to receive and render the content 114 to be tested. Several non-limiting examples of test devices 108 include eBook reader devices and media players 108-1, tablet computers 108-2, desktop or personal computers 108-3, cellular phones or smart phones 108-4, and laptops or netbook computers 108-5, to name a few. In illustrated example, the test device 108 includes an application 118 and a display 120. The application 118 may be any application that can receive and render online content 112. In some instances, the test device 108 may be a mobile device, such as a smart phone or a tablet computing device, and the application 118 may be a mobile application. The application 118 may be executed to generate an application interface 122 capable of displaying online content 112. As one non-limiting example, the application interface 122 may be a webview or similar interface created by the application 118 to enable a user to interact with the downloaded content 114 rendered in the application interface 122.

The communication link 110 may include one or more of a direct connection, a local area network (LAN), a wide area network (WAN), or any combination thereof, and may include both wired and wireless communication technologies using any suitable protocols and communication techniques. In some implementations, the communication link 110 may be a LAN connection provided by a wireless router, a network hub, a network switch, or the like. In other implementations, the communication link 110 may include the Internet. The host computing device(s) 106 and the test device 108 may communicate and interact with one another using any combination of suitable communication and networking protocols, such as Internet protocol (IP), transmission control protocol (TCP), hypertext transfer protocol (HTTP) and so forth.

In some examples, the test intermediary 102 may be used during testing of the content 114 and/or the application 118 on the test device 108. As one non-limiting example, the application 118 may be activated to download online content such as content 114. Thus, the application 118 may send a content request 124 to obtain content 114 from a particular network location, such as from a URL coded into or provided to the application. The content request 124 may be received by the host computing device 106. In some examples, rather than returning the requested content 114, the specified URL returns the test intermediary 102. In other examples, the URL returns both the test intermediary 102 and the content 114. In yet other examples, the URL returns the test intermediary 102, the content 114, and a test user interface (UI) 126. In still other examples, the test intermediary 102 and/or the test UI 126 may be present on the test device already. For instance, the test intermediary 102 and/or the test user interface 126 may be stored in a storage location on the test device 108. Additionally, in some examples, the test UI 126 is not used and the test intermediary 102 conducts automated testing on the content 114, and reports the results to a remote location, such as to the host computing device 106, cloud storage (not shown), or the like.

As one non-limiting example, to initiate testing of the content 114 on the test device 108, a user 128 may modify the application 118 so that selection of a link in the application 118 that would normally obtain the content 114 instead directs to a URL that contains the test intermediary 102 and/or the test user interface 126 in addition to or instead of the content 114. As another example, the test intermediary 102 and/or the test user interface 126 stored at a URL that is normally assigned to the content 114. In either event, the user 128 may activate a control in the application 118 that causes the application 118 to send the content request 124 for obtaining the content 114. In some examples, the requested content 114 is returned with the test intermediary 102 and the test UI 126, while in other examples, the content 114 is obtained later by the test intermediary 102 and/or the test UI 126. For example, the content 114 may be called as the test UI 126 is rendering in the application interface 122 provided by the application 118.

The content 114 may by any code capable of generating or providing content that may be rendered by an application, a browser, or the like. In some implementations, the content 114 may be an interactive webpage accessible through a webview or other application interface 122. For example, the application 118 executing on the test device 108 may receive and render the content 114. As several non-limiting examples, the content 114 may be implemented by instructions written in JavaScript®, HTML (hypertext markup language), Flash® or other suitable code that is executable to provide the content 114 to the application 118. As one concrete non-limiting example, the content 114 may be an online store, website, webpage, or the like. The test UI 126 may be a graphic user interface that can be rendered by the application 118 in the application interface 122 to enable testing of the application 118 and/or the content 114. In some examples, the test UI 126 is provided by instructions written in the same language as the content 114, or another language compatible with the content 114.

As mentioned above, the application 118 may generate or create an application interface 122 for rendering the content 114 for display to a user 128. In some implementations, the application interface 122 may be an application webview instance. Various different languages, layout engines, operating systems and platforms enable webviews, such as WebKit™, developed in part by Apple Inc. of Cupertino, Calif., and Android™, developed in part by Google Inc. of Menlo Park, Calif. As one non-limiting example, webviews may be used for providing online content directly within a computer application, typically without full browser functionality. For example, the application may render the content in a window to display the content to a user without a conventional browser interface, such as a browser address bar or other navigation and interface components typically associated with a browser. Webviews can provide custom user interfaces and enable implementation of interactive features, such as interactive menus, selectable items, and so forth. Accordingly, a webview is an example of an interface generated in association with an application to enable the application to display interactive online content. For example, a webview instance enables both the interpreting of web languages and online technologies (e.g., HTML, cascading style sheets (CSS), JavaScript®, Flash®), as well as the displaying of rendered online content in an area of a specified size. Further, while an application webview is provided as one example of the application interface 122, implementations herein are not limited to application webviews, but may include other types of application interfaces for presenting interactive online content by an application, depending on the platform, operating system and so forth of the test device.

In the illustrated example, the test intermediary 102, the test UI 126 and the content 114 are shown as being maintained on the same host computing device 106, although in other examples, the test intermediary 102 and/or the test UI 126 may be provided at separate host computing devices 106 from the content 114. The application 118 may receive and render the test UI 126 in response to the content request 124 instead of, or in addition to, the content 114. Furthermore, the content 114 may be rendered in fully functional form within an inline frame (iframe) within the test UI 126 in the application interface 122. As is known in the art, an iframe is an HTML element that enables content to be placed within another frame. Thus, the content in the iframe is able to exist and be interacted with separately from the exterior frame within which the iframe exists.

Placing the content 114 into an iframe within the test UI 126 enables implementations herein to display the test UI 126 contemporaneously with the content 114 being tested. Further, the test intermediary 102 may insert itself into a communication path between the content 114 and the application 118 to receive and/or resend communications between the content 114 and the application 118. Accordingly, both the test UI 126 and the test intermediary 102 may be transparent to the application 118 and the content 114.

As mentioned above, the test intermediary 102 and/or the test UI 126 may be utilized to perform manual or automated testing on the content 114. For example, a user 128 may manipulate one or more user interfaces or I/O devices of the test device 108 to conduct manual testing of the content 114 and/or to initiate automated testing. In some instances, the testing of the content 114 may also serve to test at least a portion of the application 118, such as the portion of the application 118 that is associated with display and interaction with the content 114. For example, because the test metrics are displayed in real time during testing, the user 128 may be able to identify whether a bug is in the content 114 or in the application 118.

Example Test User Interfaces

Figure 2:
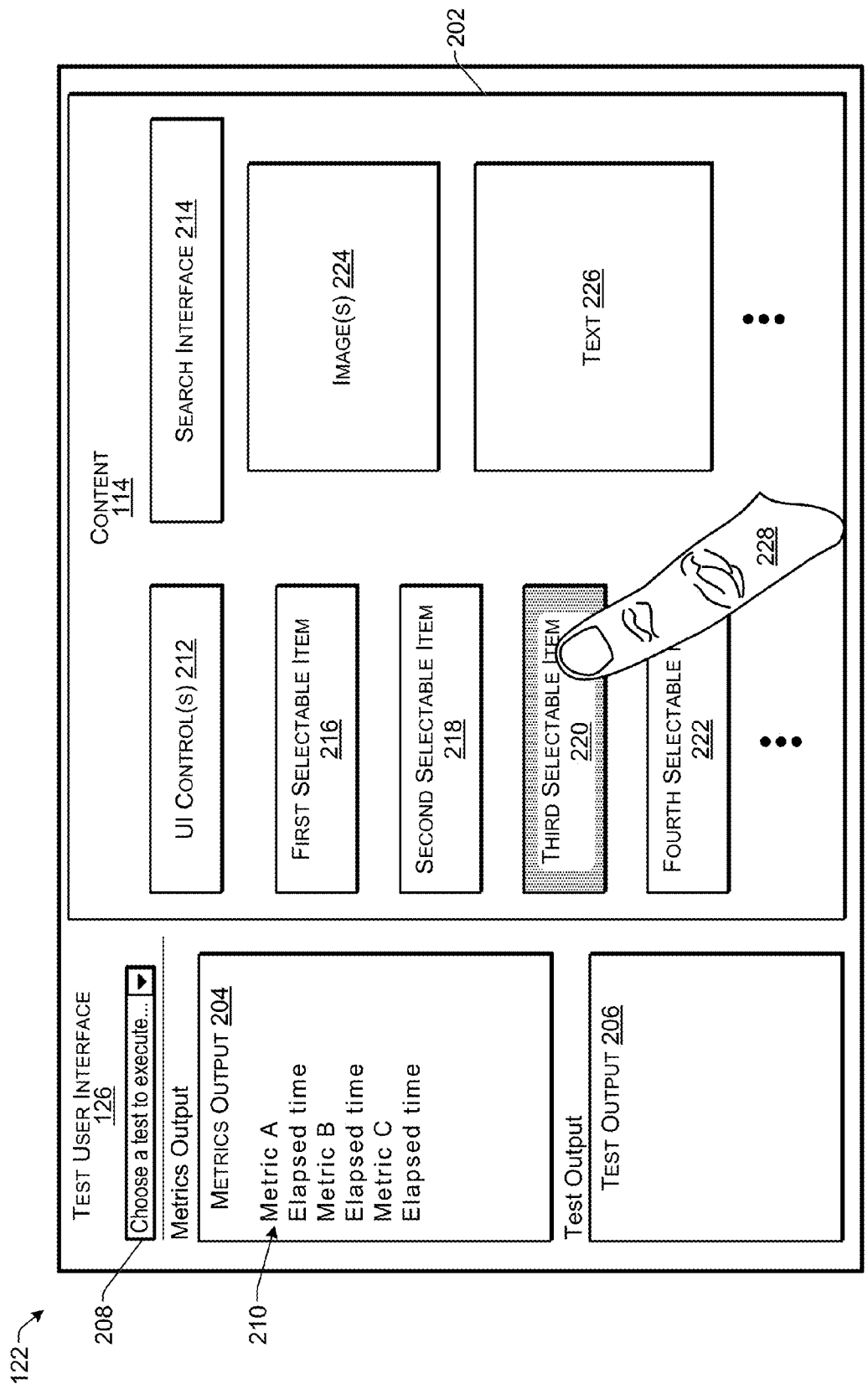
FIG. 2 illustrates an example of a test user interface that can be used for manual testing of content and/or an application according to some implementations.

FIG. 2 illustrates an example of the application interface 122 according to some implementations, which may be rendered on the display 120 of the test device 108. In the illustrated example, the application interface 122 is rendered to include the test UI 126. The test UI 126 includes an iframe 202 that contains the rendered content 114. For example, as discussed above, in response to sending a request for content 124 to a particular URL, the application 118 may receive the test intermediary 102 and the test user interface 126 in addition to or in place of the content 114. The application 118 may render the test UI 126 as if the application 118 received just the content 114. The content 114 may be received with the test UI 126, or may be obtained and rendered subsequently during the rendering of the test UI 126.

The application 118 renders and displays the content 114 in the iframe 202 within the test UI 126 based on instructions for rendering the test UI 126. Because the content 114 is contained within the iframe 202, the content 114 may maintain full functionality for receiving and responding to user interactions. Accordingly, the user 128 may manually interact with the content 114 to perform manual testing of the content 114 displayed in the application interface 122. Further, as testing is performed, test information may be provided to the test UI 126 for display to the user 128. In the illustrated example, the test UI 126 includes a metrics output 204 and a test output 206; however, other implementations of the test UI 126 may include other outputs, displays, configurations, or the like. Additionally, the test UI 126 may include a drop down menu 208 that can be used to select an automated test to initiate the automated testing of the content 114.

As also mentioned above, because the content 114 is rendered in its own isolated iframe 202 within the test UI 126, the test UI 126 may be displayed in a side-by-side (or above-below) experience by placing the test UI 126, adjacent to the iframe 202 that maintains the content 114. Accordingly, metrics data can be captured and formatted in real-time for output in a metrics output area 204 adjacent to the content 114 to enable the user 128 to view metrics 210 as the testing is being conducted. Additionally, the current state of the content 114 can be determined by the test intermediary 102 using scripts that inspect the state of the content 114, and this information may be included in a test output area 206, which also may be displayed adjacent to the iframe 202 containing the content 114. Furthermore, because the content 114 is maintained in the separate iframe 202, the user is able to view and interact with the elements of the content 114 as if the test UI 126 was not present.

The content 114 may include various types of content and interactive features, such as one or more user interface controls (e.g., buttons, hyperlinks, text entry blocks, interactive menus, etc.), text, images, video, and so forth. In the illustrated example, the content 114 includes UI controls 212, a search interface 214, such as text entry search box, a first selectable item 216, a second selectable item 218, a third selectable item 220, and a fourth selectable item 222. As one non-limiting example, suppose that the content 114 provides an online store or ecommerce site, and the application 118 includes a function that enables a user to access the online store to shop for one or more items, such as a media item. The application 118 may enable the user 128 to select an item 216-222 to obtain more information about the selected item. In this example, when one of the selectable items 216-222, such as item 220, is selected, one or more corresponding images 224 and corresponding text 226 is displayed adjacent to the selected item 220. Consequently, the content 114 may provide text 226 that describes the selected item 220, one or more images 224 that depict the selected item 220, and or one or more UI controls 212 that enable the user to purchase the selected item, browse for other items, enter account information, or the like. The user may also use the search interface 214 to search for other items, such as by keyword, category, or the like. Further, depending on the configuration of the device 108, in some implementations the content 114 may be optimized for touch interaction or various other types of input/output (I/O) control.

Hence, during manual testing of the content 114 in this example, the user 126 may manually test each of the selectable items 216-222 provided in the content 114 to ensure that the images 224 and text 226 are properly rendered when a particular selectable item is selected. For example, as illustrated in FIG. 2, the user performs a manual UI interaction when the user uses an input mechanism or input object 228 to select the third selectable item 220. Following the manual UI interaction, the user may determine whether the image 224 and text 226 corresponds to the third selectable item 220, and is properly rendered within the application interface 122. Furthermore, the user 128 may observe the metrics 210 provided in the metrics output area 204, which may provide a metric name and an elapsed time for each operation performed, and other parameters and information relating to the operations performed by the content 114 in response to the user interactions. The user may also observe any test outputs provided in the test output area 206, such as the current state of the content 114, the interaction performed, and the like.

Figure 3:
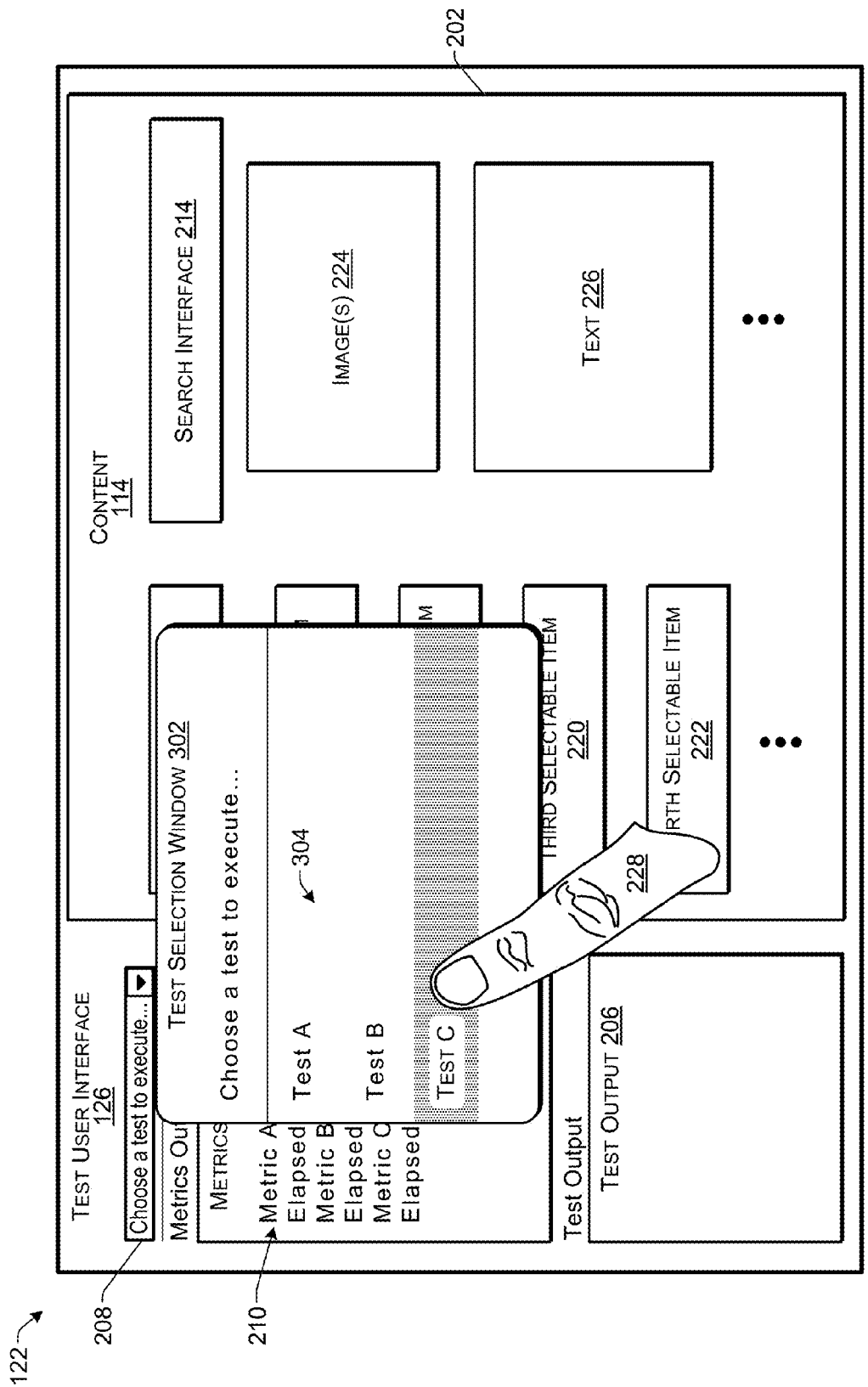
FIG. 3 illustrates an example of initiating automated testing in a test user interface for testing content and/or an application according to some implementations.

As illustrated in FIG. 3, the user 128 may also initiate automated testing through the test UI 126 according to some implementations. For example, by selecting the drop-down menu 208, the user 128 may cause a test selection window 302 to be displayed overlaid on the test UI 126. The test selection window 302 may include one or more automated tests 304, such as tests A-C that are selectable by the user to initiate automated testing of the content 114. Thus, the user may use the input object 228 to select one of the tests 304, as indicated in FIG. 3, to initiate the automated testing.

Figure 4:
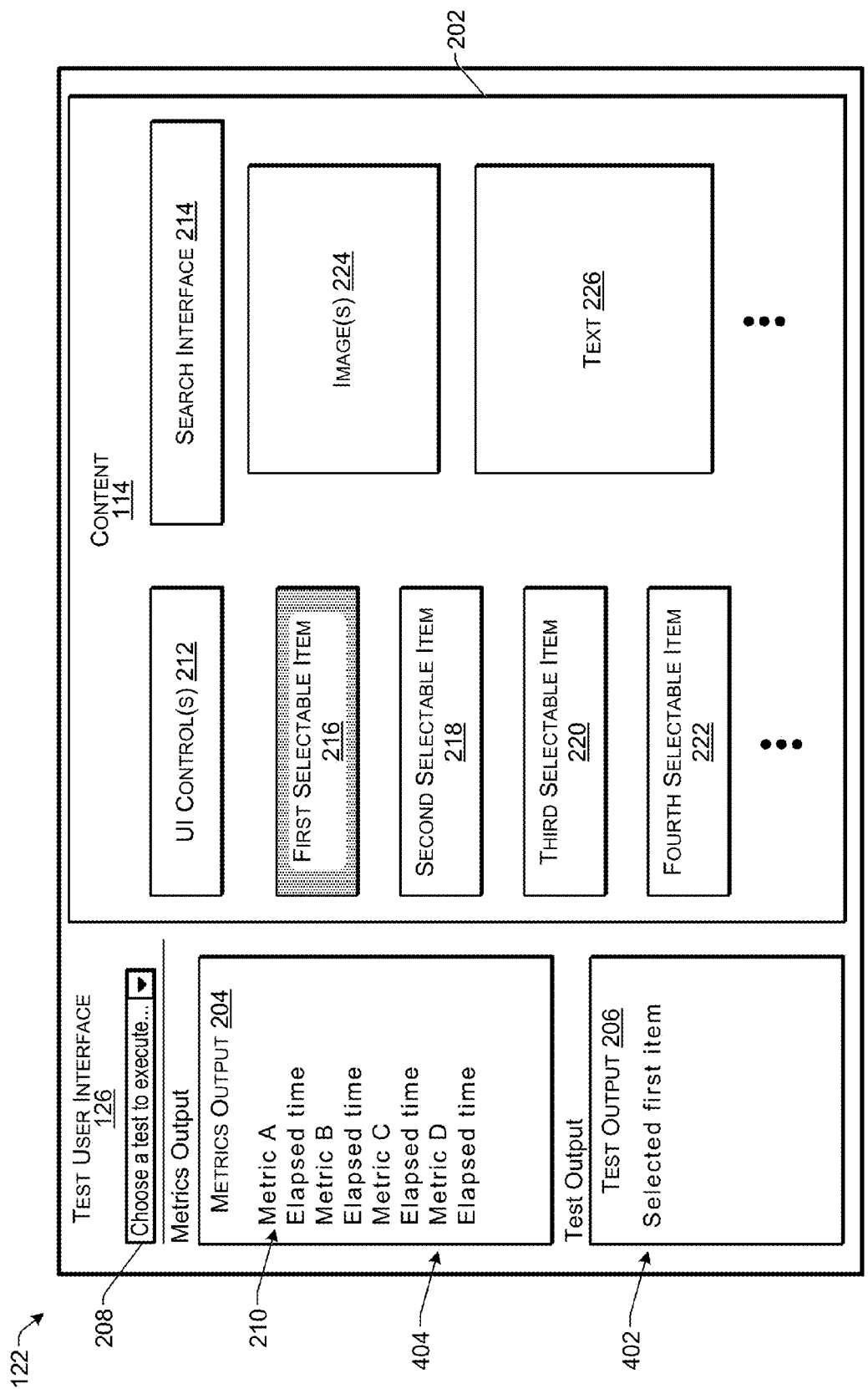
FIG. 4 illustrates an example of automated testing in a test user interface for testing content and/or an application according to some implementations.

As illustrated in FIG. 4, as the automated testing is performed, the user may be able to view the testing in real-time, as well as the displayed metrics 210 in the metrics output area 204 and test outputs 402 in the test output area 206. In the illustrated example, suppose that the automated test selects the first selectable item 216. The test output area 206 may include the test output 402 indicating that the first selectable item 216 has been selected. Furthermore, the metrics output 202 may display one or more additional metrics 404 corresponding to the selection of the first selectable item 216. In addition, the user may observe whether the images 224 and text 226 correspond to the first selectable item 216 and are rendered and displayed properly within the application interface 122. Further, while a particular concrete example has been provided above for explanation purposes, implementations herein are not limited to use with any particular type of online content, testing techniques, or the like.

Figure 5:
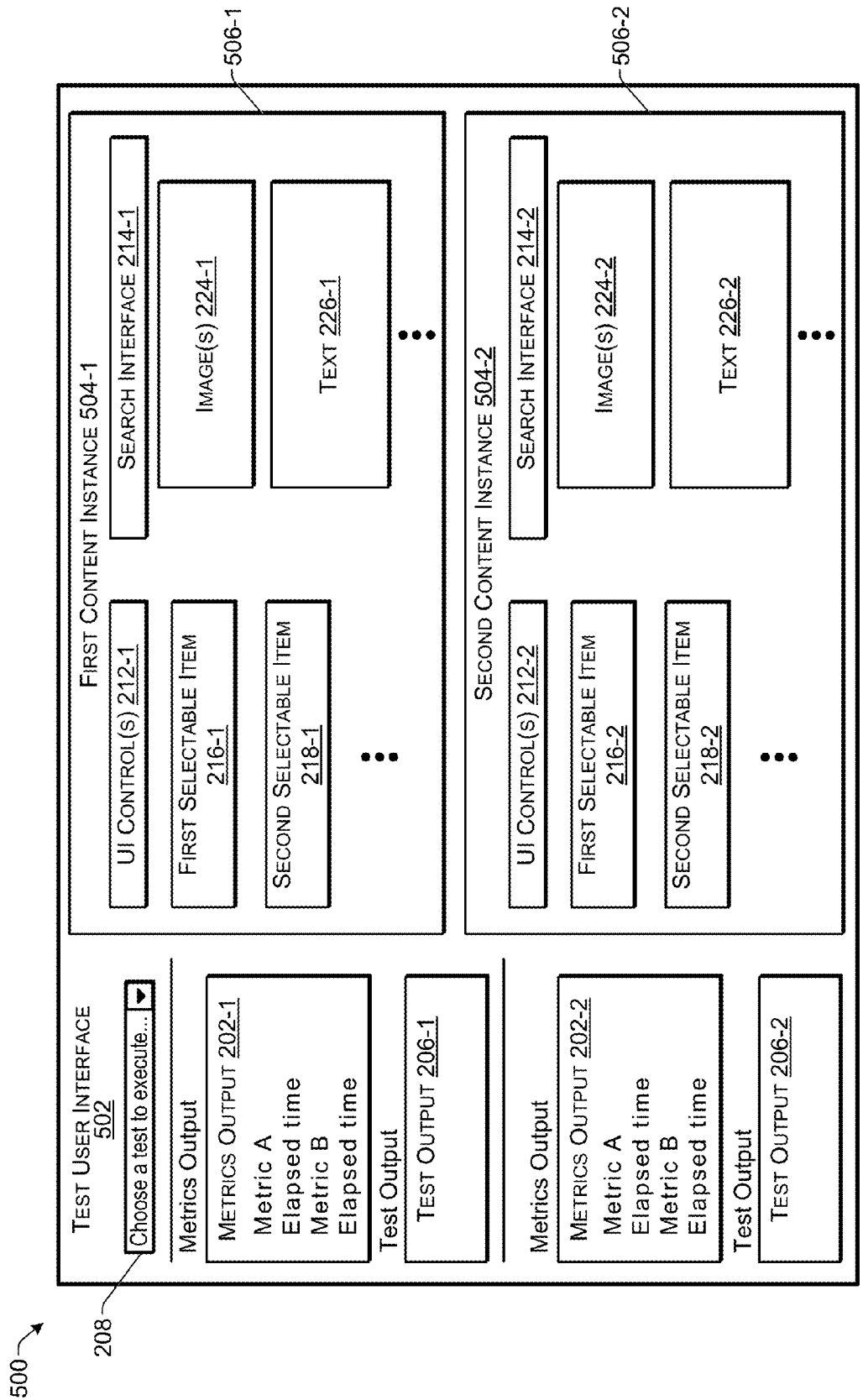
FIG. 5 illustrates an example of a webview rendered for testing two instances of content contemporaneously according to some implementations.

FIG. 5 illustrates an example of an application interface 500 that may be displayed on the display 120 of the test device 108 according to some implementations. In the example of FIG. 5, a test UI 502 may contain two separate instances of content, such as a first content instance 504-1 and a second content instance 504-2. For example, the two separate content instances 504-1, 504-2 may represent two different versions of web pages, online stores or other interactive online content. The two separate instances of content 504-1, 504-2 are displayed in two separate iframes 506-1 and 506-2, respectively. Accordingly, the test UI 502 may be used for testing the two different instances of content 504-1, 504-2 together in a side-by-side manner, such as for comparing relative performance and operation of the two different instances of content 504-1, 504-2.

As one nonlimiting example, suppose that the first content instance 504-1 is written in English and that the second content instance 504-2 is written in a different language for providing the same or similar information, performing the same or similar service, or the like. Thus, the interactive features and items 212-226 contained in each content instance 504 may differ somewhat in appearance between the two content instances 504-1, 504-2. Consequently, the two instances of web content 504-1, 504-2 may be tested contemporaneously in the single test UI 502 contained within the application interface 500. Additionally, the test UI 502 may include separate metrics output areas 202-1, 202-2 and test output areas 206-1, 206-2 corresponding to the first iframe 506-1 and the second iframe 506-2, respectively. Accordingly, the user 128 may observe the metrics corresponding to the manual or automated testing performed on each of the separate instances of content 504-1, 504-2. Furthermore, while several example configurations of an application interface having a test UI rendered therein have been described for discussion purposes, implementations herein are not limited to the particular examples provided.

Example Test Intermediary Insertion

Figure 6:
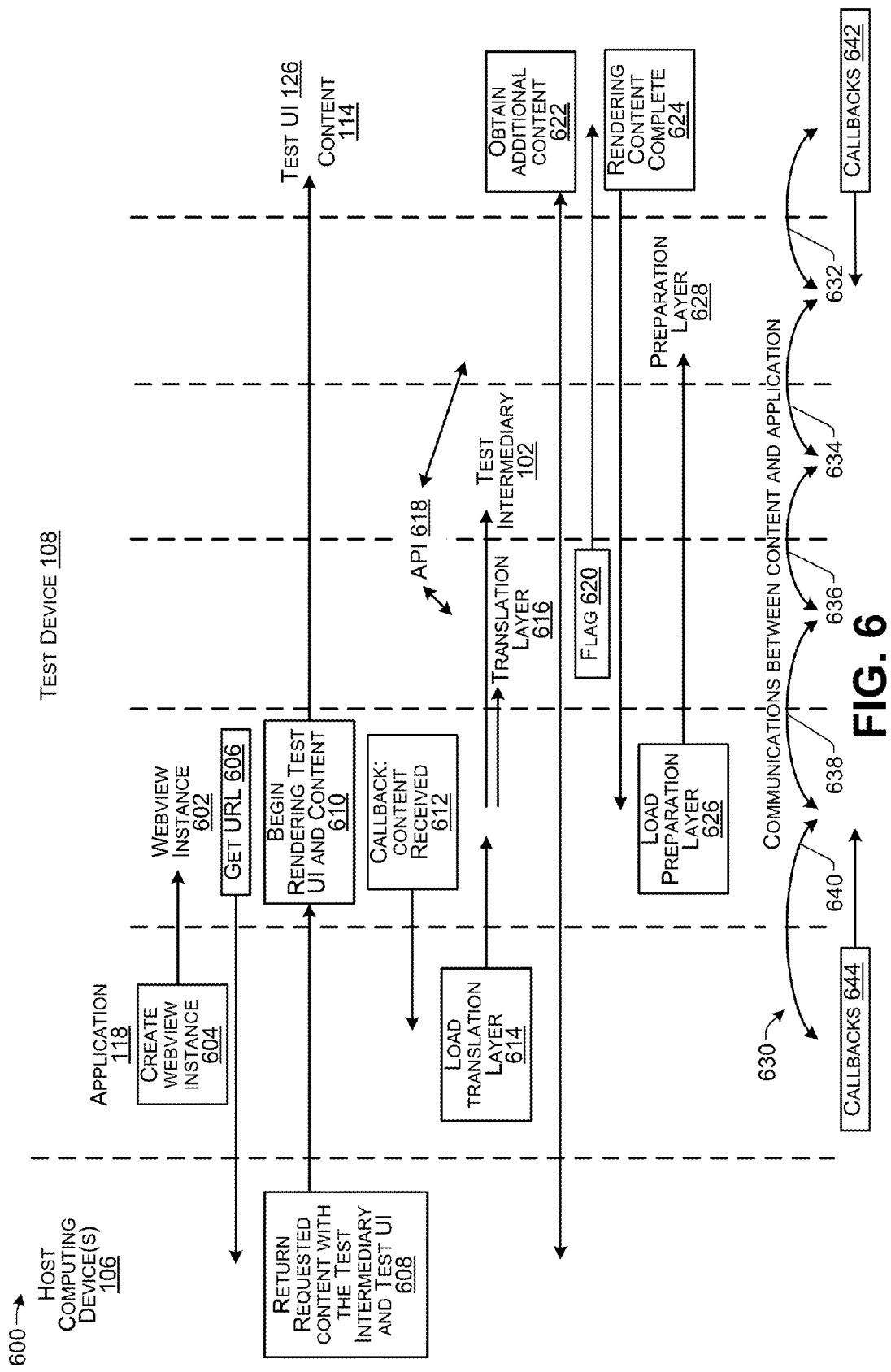
FIG. 6 illustrates an example of inserting the test intermediary for testing content and/or an application according to some implementations.

FIG. 6 is a diagram 600 illustrating an example of inserting the test intermediary 102 into communication with the application 118 and the content 114 according to some implementations herein. For example, the test intermediary 102 may be configured to insert itself into a communication path between the application 118 and the content 114. The example of FIG. 6 is described in the context of using an application webview as the application interface 122; however, similar techniques may be applied to other types of applications 118 and application interfaces 122, as will be apparent to those of skill in the art in light of the disclosure herein.

In this example, suppose that the user 128 has activated the application 118 on the test device 108 and initiated an action that will result in the application 118 obtaining and displaying online content, such as the content 114. For instance, the user 128 may wish to test the performance of the content 114 and/or test the interaction of the content 114 with the application 118. Thus, the application 118 may create a webview instance 602, as indicated at 604, that will be used to display the content 114 to the user 128. Further, the application 118 directs the webview instance 602 to access content 114 from a specified URL. The webview instance 602 initiates a request for the content 114 from the specified URL, such as by initiating an HTTP GET command for the specified URL, as indicated at 606. Based on, for example, standard HTTP communication protocols the request for the content 114 may be directed to the specified URL at the host computing device 106. The specified URL may include not only the requested content 114, but also the test intermediary 102 and the test UI 126. Alternatively, as mentioned above, in other implementations the specified URL may provide just the test intermediary 102 and the content 114. In still other implementations, the specified URL may include just the test intermediary 102 and the test UI 126, and the requested content 114 may be obtained subsequently during rendering of the test UI 126.

As indicated at 608, in the illustrated example, the host computing device 106 returns the requested content 114 with the test intermediary 102 and the test UI 126 to the webview instance 602. As indicated at 610, the webview instance 602 interprets the received data and begins rendering the test UI 126 and the content 114. The application 118 has been listening for a received-content flag or callback, as indicated at 612, from the webview instance 602. When the callback 612 is detected then, as indicated at 614, the application 118 instructs the webview 602 to load a translation layer 616. The translation layer 616 may be a piece of code that allows the application 118 to communicate with the content 114. In some implementations, the translation layer 616 is specific to an operating system of the test device 108 and may be fetched from another server, may be provided with the application 118, etc. The translation layer 616 may form one half of an application programming interface (API) 618 that defines the communication options and protocol between the content 114 and the application 118. For example, the API 618 represents an agreement or specification between the application 118 and the content 114 as to what entities will be available at certain times during communication between the application 118 and the content 114. In some examples, the API 618 may be a BrowserHost API, which is compatible with, e.g., the Apple® iOS and Android® operating systems.

In some implementations, depending on the particular configuration of the test intermediary 102, the application 118 may insert the test intermediary 102 into the communication path with the translation layer 616. In other implementations, the test intermediary 102 may insert itself into the communication path. For example, the test intermediary 102 may repatch and rewire all the functions of the API 618 so that they point to functions in the test intermediary 102. The functions in the test intermediary 102 may then be used to perform desired interactions, collect observations, modify or stop communications and requests, and so forth. The test intermediary 102 may be inserted during the initial rendering and startup of the content 114, as described in this example, such as when the translation layer 616 is initiated. In other examples, the test intermediary 102 may insert itself into the communication path afterwards, such as by emulating a start up sequence of the API 618. However, the latter option results in missing of the startup conversation between the content 114 and the application 118, which may not be desirable in some types of testing.

During loading of the translation layer 616, the translation layer 616 sets up an agreed upon flag 620 within the content 114 that causes the content 114 to send a notification when the rendering of the content 114 is complete. For example, during loading of the translation layer 616 (and possibly the test intermediary 102), the rendering of the test UI 126 and the content 114 has been ongoing. For instance, as part of the rendering, the content 114 may request additional content, as indicated at 622, such as obtaining additional images and scripts specified by the content 114. When the rendering is complete, as indicated at 624, the content 114 may trip the agreed upon flag 620. The tripping of the flag 620 begins the startup sequence for the API 618 (e.g., BrowserHost startup in some examples). As indicated at 626, the webview instance 602 loads the preparation layer 628 that forms the other half of the API 618. For example, the preparation layer 628 may be a piece of code similar to the translation layer 616 which, however, is configured for receiving communications from the content 114, rather than the application 118. Accordingly, the preparation layer 628 and the translation layer 616 enable communication between the application 118 and the content 114 according to agreed upon protocols and parameters.

With the insertion of the test intermediary 102 into a communication path 630 between the application 118 and the content 114, the test intermediary 102 is able to not only observe the communications but also change or insert communications to perform various testing functions or to achieve various desired results. As mentioned above, the test intermediary 102 is configured to receive the communications from the preparation layer 628 in place of the translation layer 616 and receive communications from the translation layer 616 in place of the preparation layer 628. Accordingly, the communication path 630 between the content 114 and the application 118 may traverse from the content 114 to the preparation layer 628, as indicated by arrow 632; to the test intermediary 102, as indicated by arrow 634; to the translation layer 616, as indicated by arrow 636; to the webview instance 602, as indicated by arrow 638; and to the application 118, as indicated by arrow 640, with communications in the opposite direction along the communication path 630 being the reverse.

In some instances, the test intermediary 102 may simply observe these communications and then forward the communications on to the respective intended layer 616, 628. However, in other instances, the test intermediary 102 may modify these communications or insert new communications in order to carry out certain functions or obtain desired effects, such as for performing automated testing and providing test information to the test UI 126, such as metrics and test outputs. Accordingly, because the test intermediary 102 operates within the communication path 630 between the application 118 and the content 114, the test intermediary can typically perform any operation that the content 114 can perform on any operating system or device able to render the content 114. For example, this includes the ability to operate automated tests with the content 114 across different devices and operating systems and report the test results to the test UI 126 or other output location. This further enables testing of the same content features with applications on multiple devices to ensure that the content features, applications and devices operate at least in accordance with minimum standards.

In an environment in which the test intermediary 102 is not present, the application 118 and content 114 may communicate one or more callbacks directly to one another. For example, the application 118 may receive callbacks 642 from the content 114, and the content 114 may receive callbacks 644 from the application 118. In some instances, the callbacks 642, 644 may be specific functions or data required of an application that desires to access the content 114. In other instances, the callbacks 642, 644 may include one or more metrics provided by the content 114 to the application 118. Accordingly, the callbacks 642, 644 may be provided according to the API 618 discussed above, whereby specific callbacks are available for specific needs of the content 114 and the application 118. Several non-limiting examples of callbacks include (1) whether the content 114 is ready for interaction; (2) a network status of the test device; (3) accessing a link to a selectable item in the content 114; (4) reporting metrics; and (5) initializing a function by passing important data, to name a few.

As one example, the content 114 may be configured to automatically record metrics to the application 118 as part of the operation of the content 114 and the application 118. As one non-limiting example, a metric may specify an action performed by the content and an amount of time elapsed to perform the action. Using a series of function calls and callbacks, the content 114 may collect the data pertaining to the metric and format the metric data. The content 114 then passes the metric data to the preparation layer 628, which passes the data to a specific record-metric function defined in the translation layer 616. The translation layer 616 takes the metric data and, if necessary, translates the metric data provided by the application into information that the application 118 can understand. The translation layer 616 then passes the metric data through the webview instance 602 to the application 118, which then does the appropriate action, such as recording or storing the metric data as the application's own metric to be batch uploaded at some future point.

In the case in which the test intermediary 102 is present in the example above, the test intermediary 102 receives the metric data in the callback from the content 114 to the application 118. The test intermediary 102 resends the callback to the translation layer 616, and also may translate and/or record the metric data. Additionally, the test intermediary 102 may provide the metric data to the test UI 126 for display in the metrics output area 204 of the test UI 126.

Another example may involve using the content 114 to download a media item to the test device 108 through the application 118. In a manner similar to that described above, the content 114 may inquire about the download progress of the media item using a callback such as "StatusRequest(item name)." The content 114 may receive no immediate reply from the application 118; however, some time later, the application 118 may respond using a similar sequence, but in reverse and with different data, i.e., using a replay "Status-Reply(the downloading status)." Accordingly, in some implementations, a communication functionality may use two-way communication that uses one call for content-114-to-application-118 communication, and another, different call for application-118-to-content-114 reply. In other implementations, however, a single communication functionality may be used. Additionally, in some examples, a callback can originate with the application 118 (e.g., informing the content 114 about the loss of wireless connectivity), rather than originating just with the content 114.

Figure 7:
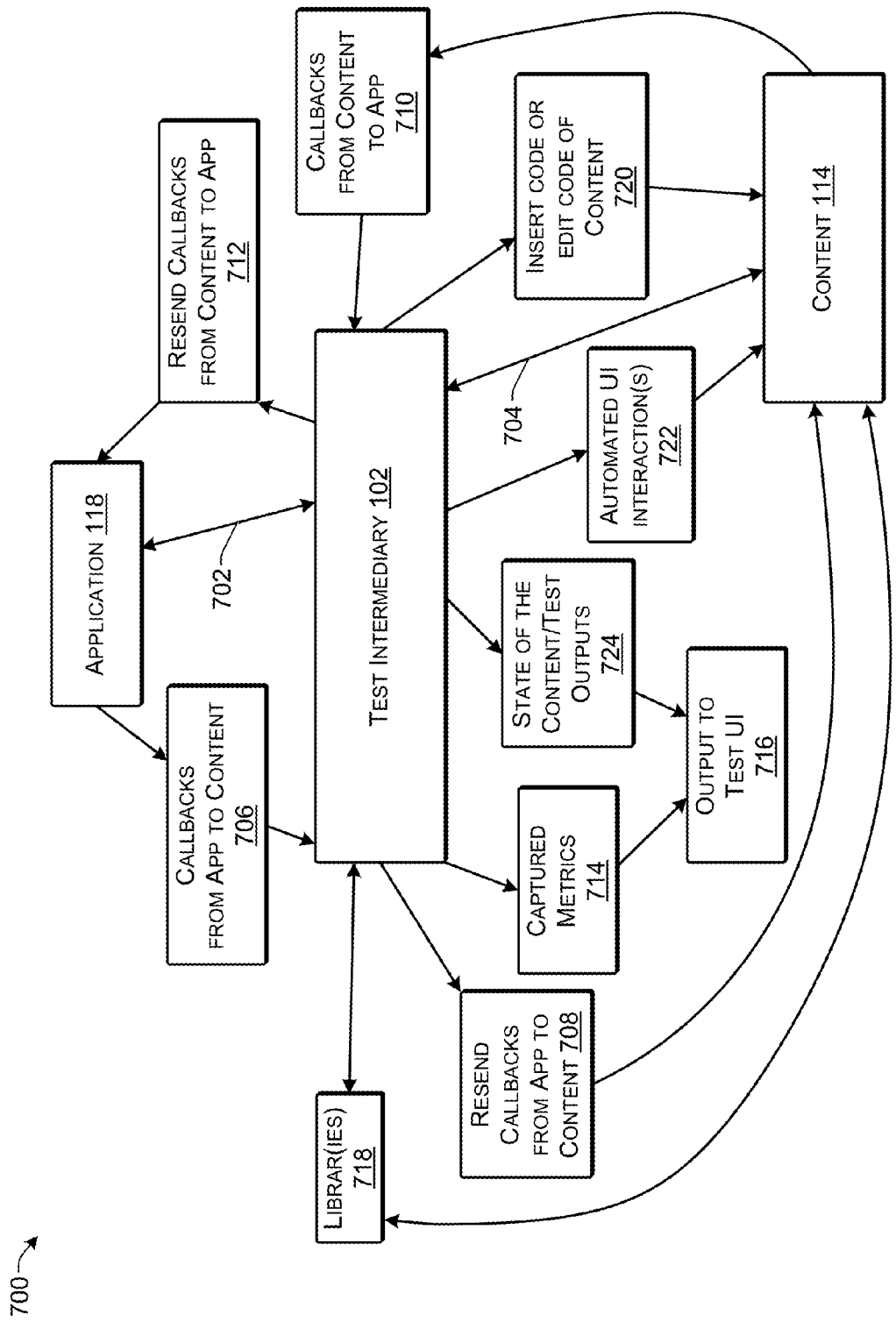
FIG. 7 illustrates an example framework of communications and interactions between the test intermediary, the content and the application according to some implementations.

FIG. 7 illustrates an example framework 700 of communications and interactions between the test intermediary, the content and the application according to some implementations. In the illustrated in example, the test intermediary 102 is in communication with the application 118, as indicated by arrow 702, and in communication with the content 114, as indicated by arrow 704. As one example, the test intermediary 102 may be in a communication path between the application 118 and the content 114 for intercepting the communications and forwarding the intercepted communications, as described above with respect to FIG. 6. As mentioned above, the insertion of the test intermediary 102 is invisible to both to the application 118 and to the content 114. Both the application 118 and the content 114 may operate as if they are still communicating with each other. This enables the test intermediary 102 to observe, modify, or create any request that operates using the API 618. The test intermediary 102 may, for example, report some debugging metrics to the test UI 126 in addition to the metrics provided by the content 114. In addition, the test intermediary 102 may perform other actions, such as modifying all the requests for media item downloading so that every attempt to select an item for download reports download failure. For example, this may be useful for ensuring that the proper error message pops up in the content 114. Numerous other scenarios are possible to directly edit or otherwise modify or affect the content 114 to achieve various simulated use conditions. Further, in some implementations, the test intermediary 102 may receive and/or report the result of actions from/to a remote computing device. Additionally, in some implementations, the communications are passed to the application 118, or may be based on a request from the application 118.

Further, because the test intermediary 102 operates in the same "sandbox" as the content 114 (i.e., the same thread, same domain, and same security protocols), the test intermediary 102 can perform the same functions as the content 114. For example, the test intermediary 102 may support running test cases and reporting the results (i.e., metrics and test outputs) to the test UI 126. This allows the user to easily test the same features or functions on multiple devices and ensure that all models, versions, and so forth are operating in the same way.

When the test intermediary 102 is included, as in the example of FIG. 7, the test intermediary 102 receives one or more callbacks from the application to the content 114, as indicated at 706, observes or records the callbacks, and resends these callbacks on to the content 114, as indicated at 708. Similarly, the test intermediary 102 receives one or more callbacks from the content 114 to the application 118, as indicated at 710, observes or records the callbacks, and resends the callbacks to the application 118, as indicated at 712. As mentioned above, the callbacks may include one more metrics provided by the content 114 (e.g., a record metrics callback) and/or the application 118. The test intermediary 102 may capture the metrics data included in the callbacks between the content 114 and the application 118, as indicated at 714, and output any metrics data to the test UI, as indicated at 716.

Further, in some implementations, because the test intermediary 102 is patched between the translation layer 616 and the preparation layer 628, the test intermediary 102 understands the communication contract between the application 118 and the content 114. The test intermediary 102 is able use this position to carry out various functions, such as automatically adapting to an application 118 or test device 108 that is compatible with the content 114. Hence, the test intermediary 102 is portable across numerous different applications, devices and platforms in a manner similar to the content 114. Additionally, in some implementations, the test intermediary 102 may temporarily remedy issues involving cookies during the testing so that the content 114 behaves in a normal manner during the testing.

In some implementations, the test intermediary 102 may utilize one or more libraries 718 that are included with or used by the content 114. For example, in some implementations, the content 114 may be written with code that relies on one or more libraries 718 for functionality or for at least one feature. As one non-limiting example, if the content 114 is written using JavaScript®, then the content 114 may include or may utilize one or more available JavaScript libraries such as the jQuery library (available from the Software Freedom Conservancy, Inc., Brooklyn, N.Y.), or other suitable library. In some examples, the library 718 may be downloaded to the device 108 as part of the content 114. Hence, in some implementations, the test intermediary 102 and/or the test UI 126 may also be implemented using JavaScript® or other suitable language, and may make use of the same library 718 as the content 114 for at least one feature of the test intermediary 102 or the test UI 126. Accordingly, the test intermediary 102 and the test UI 126 may be executable code or other processor executable instructions maintained in a memory or other computer-readable media and executed by one or more processors to perform the functions described herein.

Additionally, the test intermediary 102 can facilitate new functionality or edit existing functionality of the content 114 and use custom callbacks that may only have use to the test intermediary 102. In some implementations, the code of the content 114 may be modified during the testing. For example, as indicated at 720, the test intermediary 102 may insert new code into the content 114, or may edit the existing code of the content 114. This enables testing of conditions that may not be easily triggered using standard user interface commands, such as simulating certain operating conditions, applying unusual time constraints, or the like. For example, as mentioned above, the test intermediary 102 may modify the content 114 so that selection of each selectable item results in an error message, such as for testing an error-message-display feature of the content 114. Other possible variations will also be apparent to those of skill in the art in light of the disclosure herein.

Furthermore, as discussed above, the test intermediary 102 may perform automated testing on the content 114. As indicated at 722, the test intermediary 102 may initiate a series of user interface interactions with the content 114 to simulate various use-case scenarios, such as selecting displayed items, navigating the displayed content, and so forth. Thus, through function calls made directly to the content 114 by the test intermediary 102 through the communication path, the test intermediary 102 can directly initiate simulated user interaction with the content 114.

Additionally, as testing (manual or automated) is carried out, the test intermediary 102 may determine a state of the content 114 and/or a current test function being performed, as indicated at 724, and provide this information as test output to the test UI 126, as indicated at 716. For example, as each step in a test is performed, the step may be displayed on the test output area 206 of the test UI 126. In other examples, a current state of the content 114 may be displayed, such as downloading a media item, idle, etc.

Test Simulation Example

Figure 8:
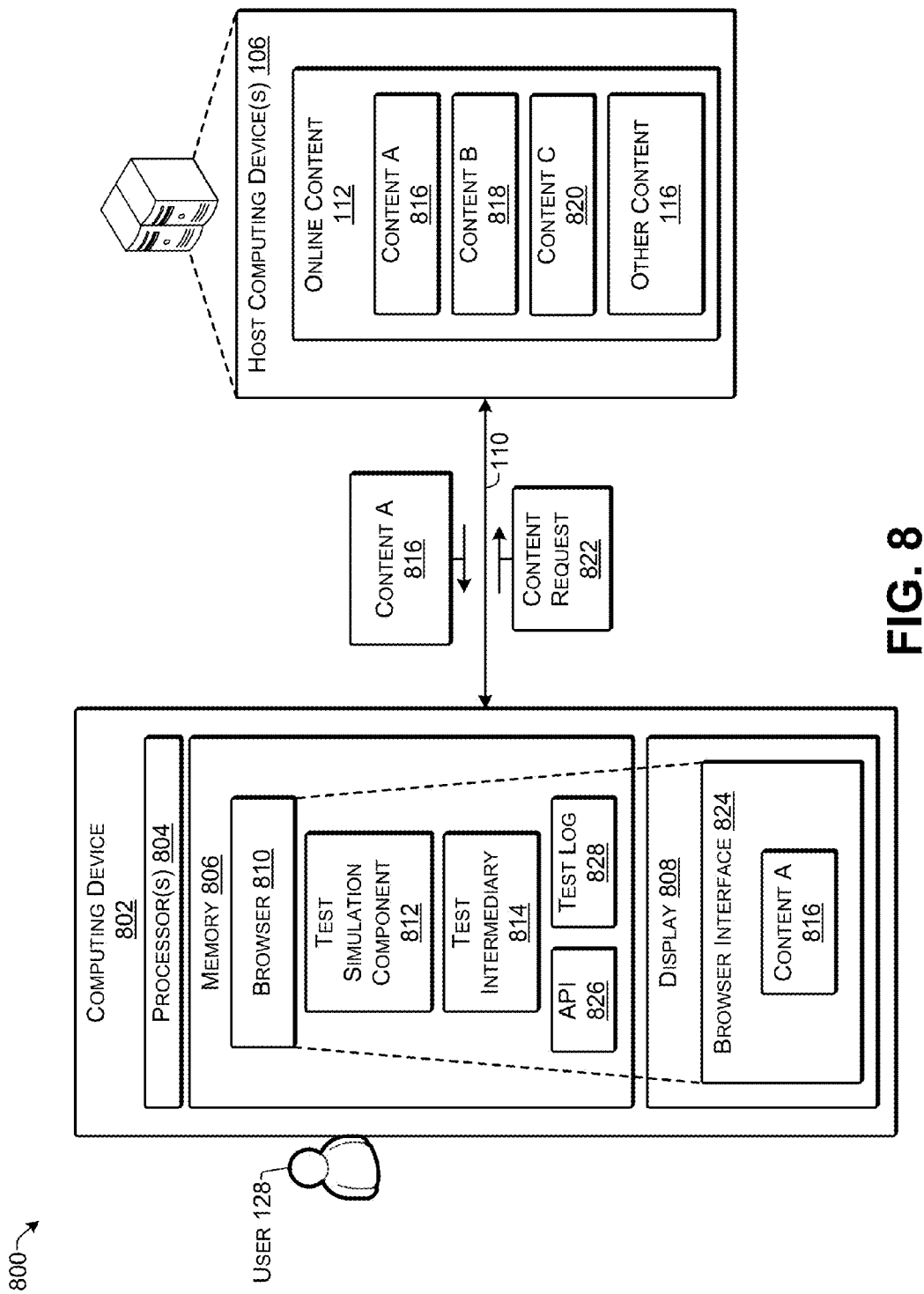
FIG. 8 illustrates an example architecture of a system for simulation testing according to some implementations.

FIG. 8 illustrates an example architecture of a system 800 that may be used for automated simulation testing of one or more instances of online content using a test intermediary according to some implementations. In the example of FIG. 8, a computing device 802 includes one or more processors 804, a memory 806 and a display 808. A browser 810, a test simulation component 812 and a test intermediary 814 may be loaded in the memory 806 for execution on the processor 804. The computing device 802 may be any computing device capable of executing a browser, and may include a personal computer or any of the other test devices 108 described above. The computing device 802 may be in communication with the host computing device(s) 106 through the communication link 110. The host computing device(s) 106 include the online content 112, which may include content A 816, content B 818, content C 820, and other content 116.

As one example, content A 816, content B 818 and content C 820 may be different versions or instances of content for testing, such as different versions of a webpage or online store for different platforms, devices, applications, or the like. For example, the test simulation component 812 may be a plug-in to the browser 810 and may work in concert with the browser 810 and the test intermediary 814 to simulate testing of the content 816-820 using the browser 810. In some instances, the test simulation component 812 may be an open source Selenium plugin available from SeleniumHQ under the Apache 2.0 License, or other suitable test simulation component that automates browser operations. Thus, the test simulation component 812 may be used to cause the browser 810 and the test intermediary 814 to perform desired interactions with the content 816-820 being tested to provide automated testing of one or more versions of the content 816-820.

In some implementations, the test simulation component 812 may be configured to cause the browser 810 to perform a content request 822 to a URL at which content A 816 is located. In other implementations, the user 128 may manually cause the browser 810 to download the content A 816. The browser 810 may receive the content A 816 and render the content A 816 in a browser interface 824 on the display 808. During rendering, the browser interface 824 may establish a communication path between the browser 810 and the content A 816 that includes an API 826 (e.g., having a translation layer and a preparation layer) similar to the communication path 630 and API 618 described above with respect to FIG. 6. Further, the test intermediary 814 may be inserted into the communication path between the content A 816 and the browser 810. For example, the test intermediary 814 may be similar to the test intermediary 102 described above, and may be patched into the functions of the API 826 so that the test intermediary 814 intercepts communications between the browser 810 and the content A 816. The test simulation component 812 serves as a controller that can automatically execute one or more tests on the content A 816 by calling into the test intermediary 814 and then aggregating one or more test logs 828 to enable automated reports of each test. Thus, the test simulation component 812 may manage which URL (i.e., version of the test content) is loaded with what parameters, and may enable sequential testing of multiple versions of content, such as content A 816, content B 818 and content C 820 for comparison and verification purposes.

As one non-limiting example, the test simulation component 812 may sequentially deliver one or more instructions to the test intermediary 814, which in turn communicates one or more automated UI interaction to the content A 816, similar to the automated UI interactions 722 described above. For example, the test simulation component 812 can issue Java- Script® function calls, which initialize one or more automated tests that reside within the test intermediary 814. In response to the automated tests of the test intermediary 814, the content A 816 may provide one or more metrics in communications to the browser 810, which are intercepted by the test intermediary 814 in the manner described above with respect to FIGS. 6 and 7. For example, the content A 816 may provide metrics in communications to the browser 810 in response to receiving one or more automated UI interactions from the test intermediary 814. The test intermediary 814 may store the captured metrics in the test log 828 or the like. Further, when the testing of the content A 816 is complete, the test simulation component 812 may next load another instance of the content, such as content B 816 for performing the testing. Additionally, in some implementations, the test UI 126 may also be rendered on the display 808 to enable a user to view the captured metrics and other test information in real time. Accordingly, the example of FIG. 8 enables automation of testing of multiple instances of the content using the test intermediary 814, which does not require manual interaction to open the browser 810 to the test intermediary 814 or initiation of individual automated tests manually. Consequently, the implementation of FIG. 8 is useful for testing certain features of the content 816-820, but unlike the examples of FIGS. 1-7, does not enable testing of the interaction of the content with a particular application on a test device or platform.

Example Processes

FIGS. 9-12 illustrate example processes for implementing the techniques described above using the test intermediary according to some implementations. These processes are illustrated as a collection of operations in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures and environments described in the examples herein, although the processes may be implemented in a wide variety of other architectures or environments.

Figure 9:
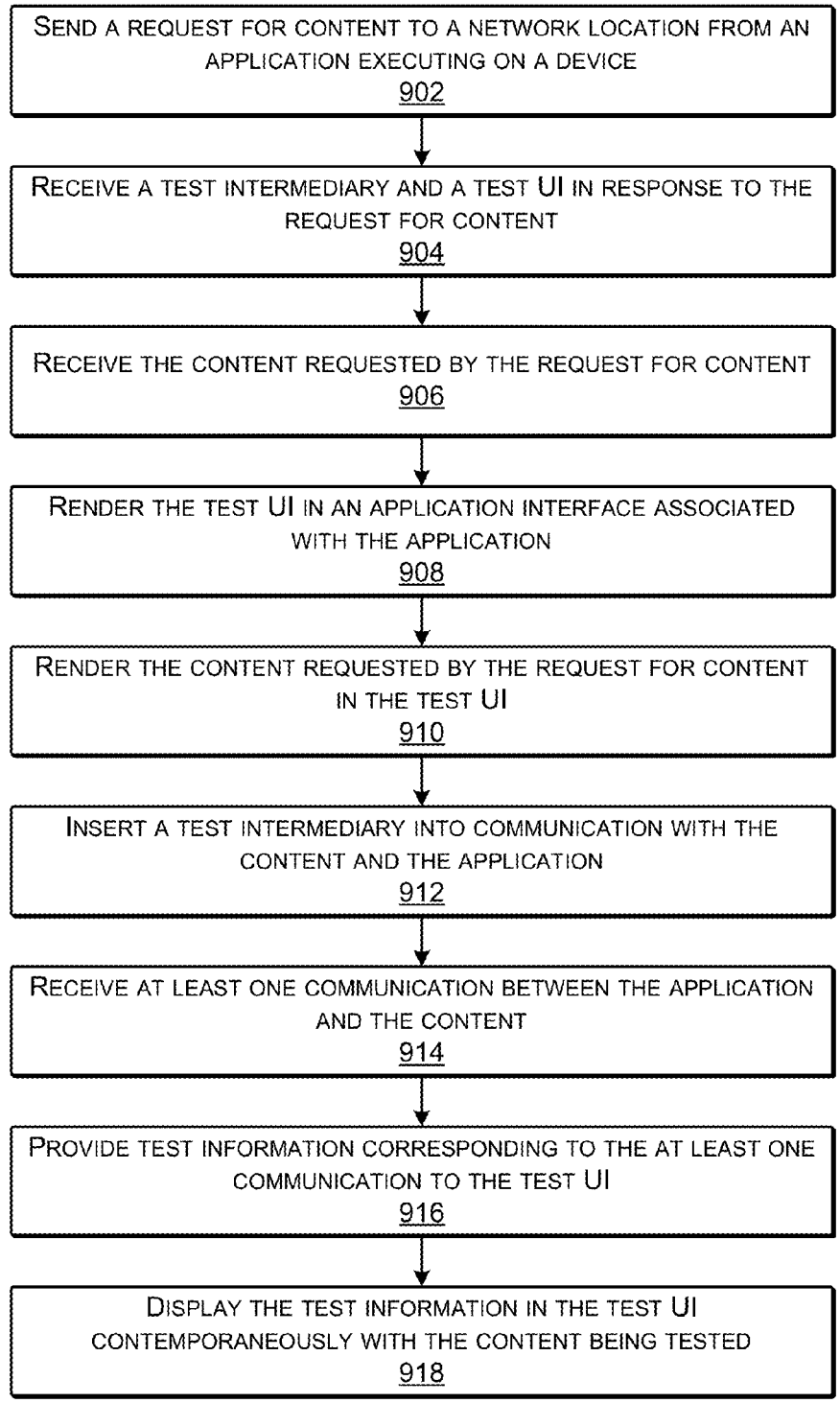
FIG. 9 is a flow diagram illustrating an example process for providing a test intermediary and content to a device according to some implementations.

FIG. 9 is a flow diagram illustrating an example process 900 that may be executed on the test device according to some implementations herein.

At block 902, an application on a device sends a request for content to a specified network location. For example, in response to a user interaction the application 118 on the test device 108 may send a request to download content from a specified URL.

At block 904, the test device receives a test intermediary and a test UI in response to the request for content. In this example, the test intermediary 102 and the test UI 126 may be provided to the test device 108 over a network in response to the request for content made to the specified URL.

At block 906, the test device receives the content requested by the request for content. In some examples, the content requested may be received with the test intermediary and the test UI. In other examples, the requested content may be received subsequently during rendering of the test UI.

At block 908, the test UI is rendered in an application interface associated with the application. For example, the test UI may be rendered in an application webview or other suitable application interface provided by the application.

At block 910, the content is rendered in the test UI. For example, the content requested by the request for content may be rendered in an inline frame (iframe) within the test UI.

At block 912, the test intermediary is inserted into communication with the content and the application. For example, in some implementations, the test intermediary may be patched between a first part of an API and a second part of an API that specifies communications between the application and the content. In a particular example, the test intermediary may be patched into the functions of a translation layer that communicates with the application, and a preparation layer that communicates with the content.

At block 914, the test intermediary receives at least one communication between the application and the content. For example, the test intermediary may intercept callbacks and other communications between the content and the application and may resend these communications or send alternative communications for carrying out testing or achieving various other results with respect to the content.

At block 916, the test intermediary provides test information corresponding to the at least one communication to the test UI. For example, the test intermediary may provide test metrics, test outputs, or other test information to the test UI.

At block 918, the test UI displays the test information contemporaneously with the content being tested. For example, the test UI may display the test metrics, test outputs, and the like, adjacent to the display of the content in the iframe within the test UI.

Figure 10:
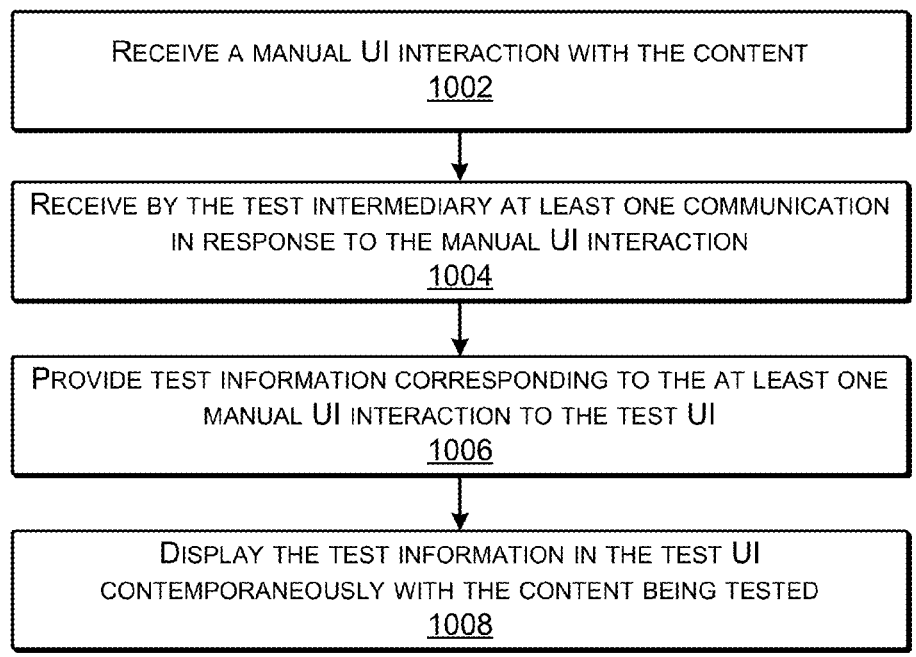
FIG. 10 is a flow diagram illustrating an example process for manual testing according to some implementations.

FIG. 10 is a flow diagram illustrating an example process 1000 that may be performed for executing manual testing according to some implementations.

At block 1002, a manual UI interaction with the content is received at the test device. For example, a user may manually interact with the content rendered in the test UI on the test device.

At block 1004, the test intermediary receives at least one communication in response to the manual UI interaction with the content. For example, in response to the manual UI interaction, the content may send a metric callback to the application. The test intermediary may receive this callback, determine a metric, and resend the callback to the application.

At block 1006, the test intermediary may provide test information corresponding to the at least one manual UI interaction to the test UI. For example, the test intermediary may provide the determined metric to the test UI along with any other corresponding test outputs or test information.

At block 1008, the test information is displayed in the test UI contemporaneously with the content being tested. For example, the test UI may display the captured metric and any other corresponding test information adjacent to the content in real-time.

Figure 11:
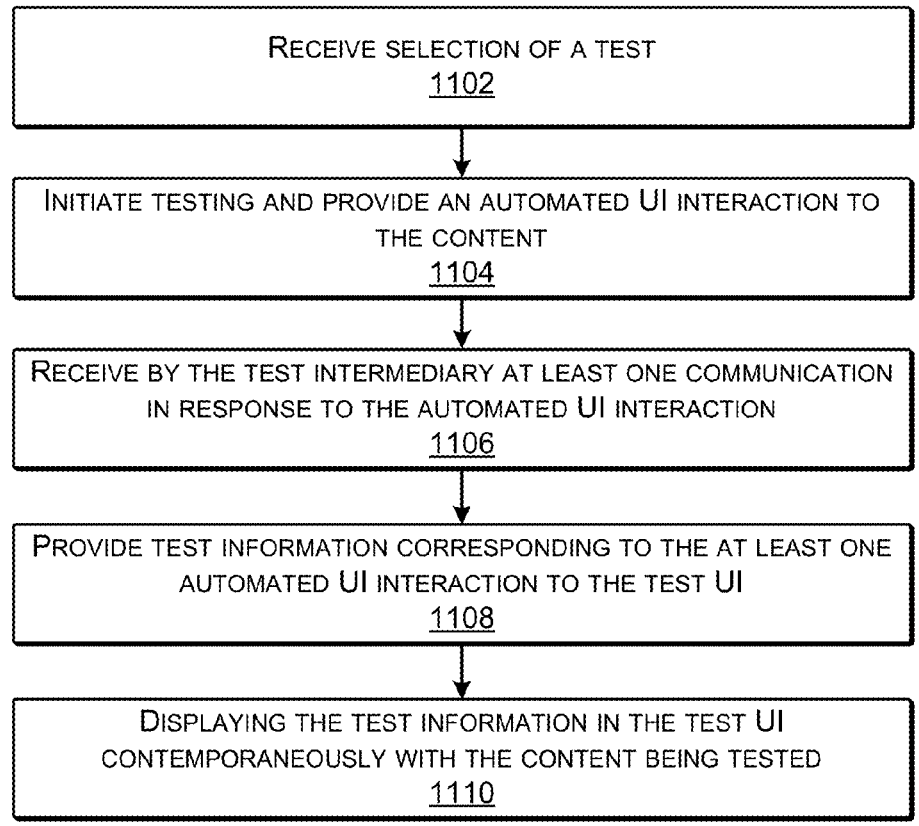
FIG. 11 is a flow diagram illustrating an example process for automated testing according to some implementations.

FIG. 11 is a flow diagram illustrating an example process 1100 that may be performed for conducting automated testing according to some implementations.

At block 1102, a selection of an automated test is received. For example, the test UI may provide an interactive menu that enables a user to select an automated test to be performed with respect to the content on the test device.

At block 1104, the test intermediary initiates testing and provides an automated UI interaction to the content. For example, in response to the selection of an automated test, the test intermediary may perform the automated test by sending communications to the content. In some implementations, the communications may include one or more automated UI interactions with the content.

At block 1106, the test intermediary receives at least one communication in response to the automated UI interaction. For example, the test intermediary may intercept a communication of a metric from the content to the application made by the content in response to the automated UI interaction.

At block 1108, the test intermediary provides test information corresponding to the at least one automated UI interaction to the test UI. For example, the test intermediary may provide at least one captured metric corresponding to the automated UI interaction to the test UI along with any other relevant test output or information.

At block 1110, the test UI displays the test information contemporaneously with the content being tested. For example, the test UI may display the captured metric and any other corresponding test information adjacent to the content in real-time.

Figure 12:
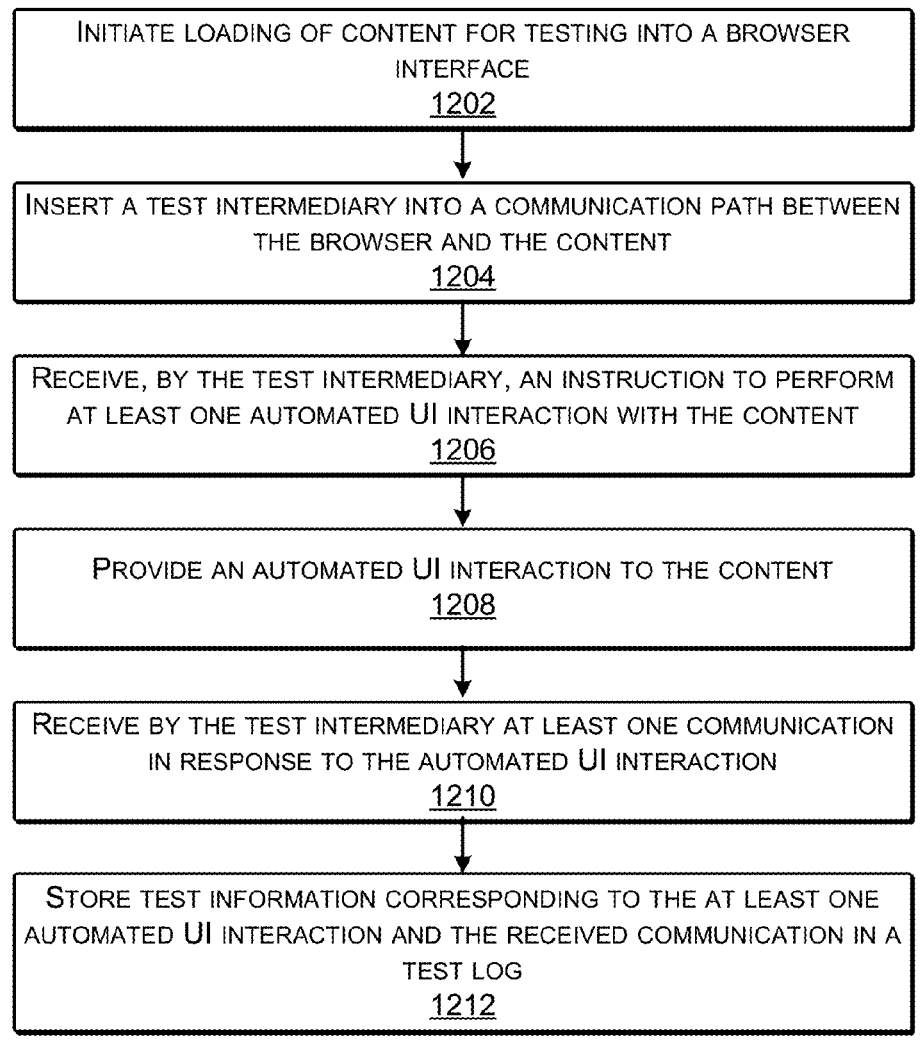
FIG. 12 is a flow diagram illustrating an example process for simulation testing according to some implementations.

FIG. 12 is a flow diagram illustrating an example process 1200 that may be performed on a computing device when conducting simulated testing according to some implementations.

At block 1202, content to be tested is loaded into a browser interface. For example, a test simulation component may cause the browser to access and download a particular instance of content for testing.

At block 1204, a test intermediary is inserted into a communication path between the browser and the content. For example, the test intermediary may be patched into communication with an API that enables communication between the browser and the content. One example of such an API is referred to herein as the BrowserHost API, which is compatible with Apple® iOS and Android® operating systems.

At block 1206, the test intermediary receives at least one instruction to perform at least one automated UI interaction with the content. For example, the test simulation component may instruct the test intermediary to perform one or more automated UI interactions with the content. In some implementations, the test simulation component may instruct the test intermediary to commence with one or more automated tests included with the test intermediary.

At block 1208, an automated UI interaction is provided to the content. For example, the test intermediary may communicate an automated UI interaction to the content through the communication path.

At block 1210, the test intermediary receives a communication in response to the automated UI interaction. For example, the test intermediary may intercept a communication of a metric from the content to the browser made by the content in response to the automated UI interaction.

At block 1212, the test intermediary stores test information corresponding to the at least one automated UI interaction and the received communication to a test log. For example, the test intermediary may provide at least one captured metric corresponding to the automated UI interaction to the test log along with any other relevant test output or test information.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Example Computing Devices

Figure 13:
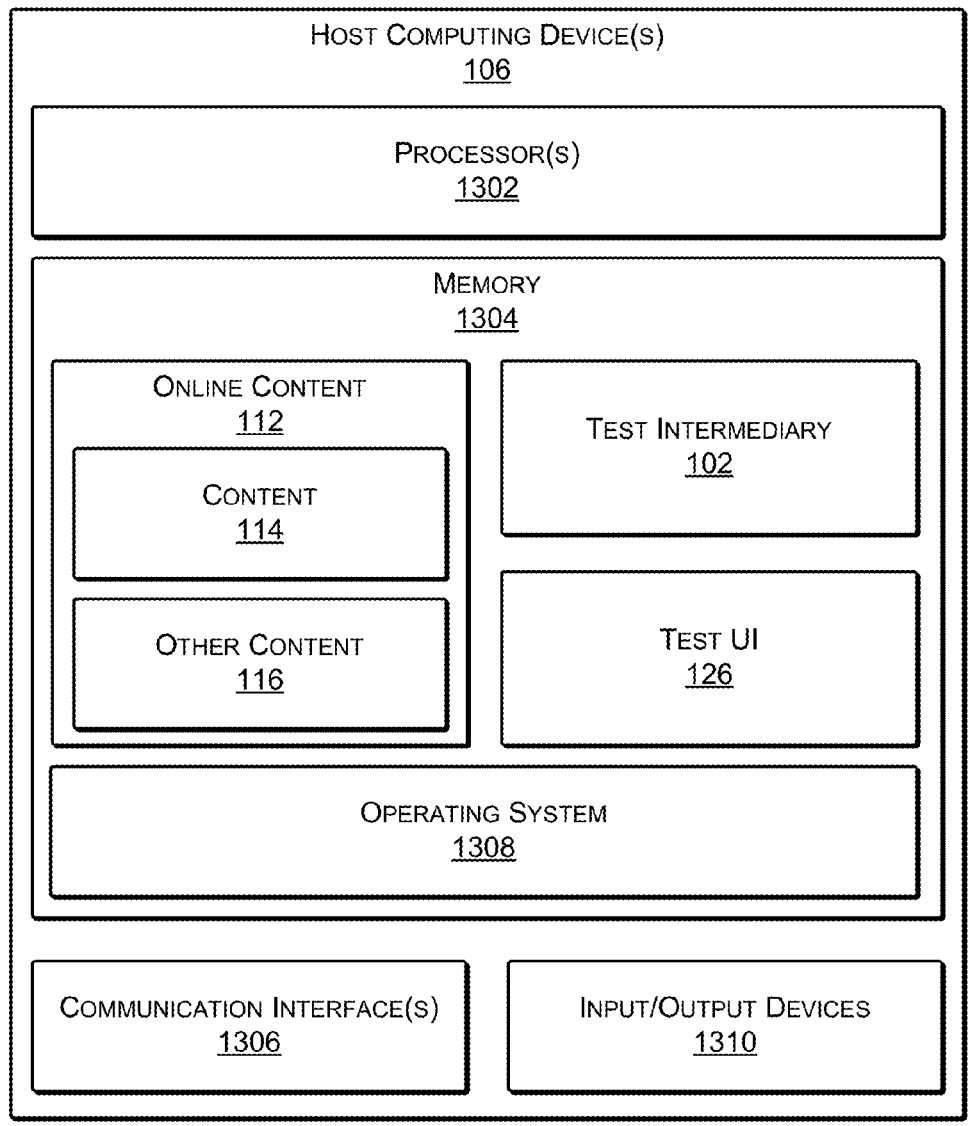
FIG. 13 illustrates select components of one or more example host computing devices according to some implementations.

FIG. 13 illustrates select components of the one or more host computing devices 106 that may be used to provide the test intermediary 102, the test UI 126 and/or the content 114 to be tested according to some implementations. For example, the test intermediary 102, the test UI 126 and/or the content 114 may be maintained on one or more servers or other types of computing devices that may be embodied in any number of ways. For instance, in the case of a server, the test intermediary 102, the test UI 126 and/or the content 114 may be maintained on a single server, a cluster of servers, a server farm or data center, a cloud hosted computing service, and so forth, although other computer architectures (e.g., a mainframe architecture) may also be used. As one example, the host computing device(s) 106 may be one or more preproduction servers that maintain the content 114 to be tested and the test intermediary 102 and test UI 126. Further, while the figures illustrate the test intermediary 102, the test UI 126 and the content 114 as being present in a single location, it is to be appreciated that these components may be distributed across different computing devices and locations in any manner. The computing devices may be located together or separately, and organized, for example, as virtual machines, individual computers, clusters of computers, or the like.

In the illustrated example, the host computing device 106 includes one or more processor(s) 1302, a memory 1304, and one or more communication interfaces 1306. The processor(s) 1302, as well as the other processors described herein (e.g., processor(s) 804 and processor(s) 1402), may be a single processing unit or a number of processing units, and may include single or multiple computing units or multiple cores. The processor(s) 1302 can be configured to fetch and execute computer-readable instructions stored in the memory 1304 or other computer-readable media.

The memory 1304, as well as the other memories described herein (e.g., memory 806 and memory 1404), may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium which can be used to store the desired information and which can be accessed by a computing device. Depending on the configuration of the host computing device 106, the memory 1304 may be a type of computer-readable storage media and may be a non-transitory storage media.

The memory 1304 may be used to store any number of components. For example, the memory 1304 may store the test intermediary 102 and/or the test UI 126. The memory 1304 may further store the online content 112, including content 114, such as a webpage or website configured to provide one or more instances of content to be tested, other content 116, and an operating system 1308 for controlling and managing various functions of the host computing device 106. The host computing device 106 may also include many other logical, programmatic and physical components, of which those described above are merely examples that are related to the discussion herein.

The communication interface(s) 1306 may include one or more interfaces and hardware components for enabling communication with various other devices, such as test devices 108 and/or other computing devices, such as computing device 802 over the communication link 110. For example, communication interface(s) 1306 may facilitate communication through one or more of the Internet, cable networks, cellular networks, wireless networks (e.g., Wi-Fi, cellular) and wired networks. Various different approaches to implementations described herein can be implemented in various environments. For instance, the communication link 110 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

Host computing device(s) 106 may further be equipped with various other input/output (I/O) devices 1310. Such I/O devices 1310 may include a display, various user interface controls (e.g., buttons, joystick, mouse, keyboard, touch screen, etc.), audio speakers, connection ports and so forth.

Figure 14:
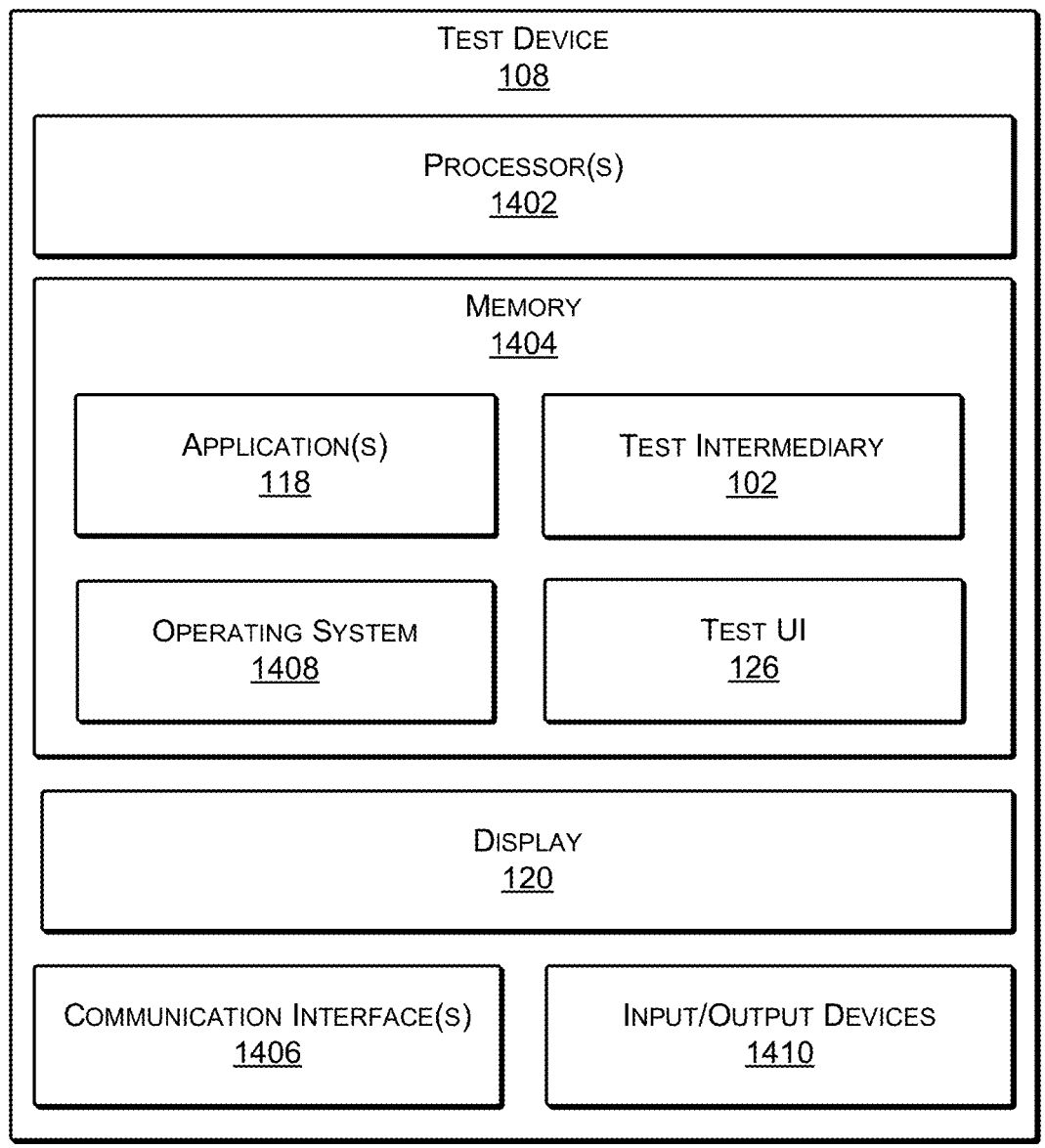
FIG. 14 illustrates select components of an example test device according to some implementations.

FIG. 14 illustrates select components of the test device 108 according to some implementations. For example, the test device 108 in this example may correspond to any one of numerous different types of devices that may execute one or more application(s) 118 during testing of content, as discussed, for example, with respect to FIGS. 1-7 and 9-11. Alternatively, the test device 108 may correspond to the computing device 802 that may execute the browser 810 and the test simulation component 812 for testing of content as discussed, for example, with respect to FIG. 8. In the illustrated example, the test device 108 includes one or more processors 1402, a memory 1404, one or more communication interfaces 1406, and the display 120. The processors 1402 and the memory 1404 may be any of the types of processors and memory described above with respect to processors 1302 and memory 1304, respectively.

The memory 1404 may be used to store any number of functional components that are executable on the processors 1402. In many implementations, these functional components comprise instructions or programs that are executable by the processors 1402 and that implement operational logic for performing the actions attributed above to the test device 108. In addition, the memory 1404 may store various types of data that are referenced by the executable components.

In some implementations, the memory 1404 may maintain one or more applications 118 that are executable by the processor 1402, such as for accessing and rendering the content 114. The memory 1404 may further include the test intermediary 102 and the test UI 126 as functional components executable by the processor 1402 for performing the functions described herein. In some cases, the test intermediary 102 and test UI 126 may be downloaded to the memory 1404 from a network location, such as a URL, in response to a request for the content 114 to be tested. Memory 1404 may also store an operating system 1408 that may control the various functions of the test device 108.

The communication interface(s) 1406 may include one or more interfaces and hardware components for enabling communication with various other devices and modules, such as the host computing devices 106 over the communication link 110. For example, communication interface(s) 1106 may facilitate communication through one or more of a LAN, WAN, the Internet, cable networks, cellular networks, wireless networks (e.g., Wi-Fi, cellular) and wired networks or a direct connection.

In some implementations, the display 120 may be a touch sensitive or touchscreen display able to serve as an I/O device.

In addition to the display 120, the test device 108 may further be equipped with various other I/O devices 1410. Such I/O devices 1410 may include various user interface controls (e.g., buttons, mouse, joystick, keyboard, etc.), audio speakers, connection ports and so forth.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method comprising:
presenting, by a device, on a display associated with the device, a test user interface (UI), wherein the device presents the test UI in a webview instance associated with an application;
presenting, by the device, content concurrently with the test UI;
receiving an interaction with the content presented concurrently with the test UI, the interaction causing a communication between the content and the application;
receiving, by a test intermediary, the communication between the content and the application;
providing, by the test intermediary, to the test UI, test information corresponding to the communication; and
presenting the test information in the test UI contemporaneously with the content.

2. The method as recited in claim 1, wherein presenting the content further comprises presenting the content in an inline frame presented within the test UI in the webview instance.

3. The method as recited in claim 1, wherein receiving the interaction with the content comprises at least one of:
receiving a user input associated with manual testing of at least one of the content or the application; or
receiving an input from the test intermediary for performing automated testing of at least one of the content or the application.

4. The method as recited in claim 1, wherein receiving the communication between the content and the application comprises:
receiving, by the test intermediary, a callback from the content, wherein the callback is intended for the application;
recording a metric associated with the callback;
sending the callback to the application; and
providing the metric as at least a portion of the test information provided to the test UI.

5. The method as recited in claim 1, further comprising inserting the test intermediary into a communication path between the application and the content.

6. The method as recited in claim 1, further comprising storing the test information in a test log.

7. A method comprising:
presenting, by a device, content on a display associated with the device;
receiving an input for interacting with the content;
positioning a test intermediary in a communication path between the content and an application;
receiving, by the test intermediary, in response to the input, a communication between the content and the application; wherein the content and the application communicate with one another through an application programming interface (API) having a first part that communicates with the application and a second part that communicates with the content, the first part and the second part communicating with one another, and configuring the test intermediary to receive communications from the first part of the API that communicates with the application and from the second part of the API that communicates with the content and
determining, by the test intermediary, test information based at least in part on the communication.

8. The method as recited in claim 7, further comprising:
presenting a test user interface (UI) on the display concurrently with the content; and
presenting the test information in the test UI.

9. The method as recited in claim 7, further comprising receiving the test intermediary, by the device, in response to sending a request to obtain the content from a network location.

10. The method as recited in claim 7, wherein receiving the communication between the content and the application comprises:
receiving, by the test intermediary, a callback from the content, wherein the callback is intended for the application;
recording a metric associated with the callback as at least a portion of the test information; and
sending the callback to the application.

11. The method as recited in claim 7, wherein receiving the input for interacting with the content comprises at least one of:
receiving a user input associated with manual testing of at least one of the content or the application; or
receiving an input from the test intermediary for performing automated testing of at least one of the content or the application.

12. The method as recited in claim 7, further comprising:
determining, by the test intermediary, a state of the content; and
presenting an indication of the state of the content in a test user interface presented on the display.

13. The method as recited in claim 7, further comprising:
editing, by the test intermediary, code of the content on the device; and
receiving the input for interacting with the content following the editing the code of the content.

14. The method as recited in claim 7, further comprising:
presenting a test user interface (UI) on the display;
presenting the content as a first instance of content within a first inline frame (iframe) in the test UI;
receiving a second instance of content for presentation as a second instance of content in a second iframe in the test UI; and
presenting the test information in the test UI, wherein the test information corresponds to the first instance of content and the second instance of content.

15. A device comprising:
a display;
one or more processors; and
one or more non-transitory computer-readable media including instructions which, when executed by the one or more processors, program the one or more processors to:
present content on the display;
cause an interaction with the content, the interaction causing the content to send a communication to an application, the communication comprising a callback from the content to the application;
receive the communication from the content to the application;
determine test information based at least in part on the communication;
determine a metric associated with the callback as at least a portion of the test information;
send the callback to the application; and
store the test information in a test log.

16. The device as recited in claim 15, wherein the instructions further program the one or more processors to:
present, on the display, a test user interface (UI); and
present the content in an inline frame (iframe) within the test UI.

17. The device as recited in claim 16, wherein the instructions further program the one or more processors to implement a test intermediary to:
determine the test information corresponding to the communication; and
send the test information to the test UI for presentation concurrently with the content presented in the iframe.

18. The device as recited in claim 15, wherein the instructions further program the one or more processors to generate at least one instruction for an automated interaction to cause the interaction with the content.

19. The device as recited in claim 15, wherein the instructions further program the one or more processors to:
send a request for the content to the network location;
receive, in response to the request for content, instructions for implementing at least one of a test intermediary or a test user interface; and
receive the content, wherein the content includes executable code enabling the content to be interactive.

20. The device as recited in claim 15, wherein the content and the application communicate with one another through an application programming interface (API) having a first part that communicates with the application and a second part that communicates with the content, the first part and the second part communicating with one another, wherein the instructions further program the one or more processors to:
position a test intermediary in a communication path between the content and the application by configuring the test intermediary to receive communications from the first part of the API that communicates with the application and from the second part of the API that communicates with the content.

* * * * *